United States Patent
Rode et al.

(10) Patent No.: US 10,100,872 B1
(45) Date of Patent: Oct. 16, 2018

(54) SYSTEMS AND METHODS FOR PRELOADING A BEARING AND ALIGNING A LOCK NUT

(71) Applicant: TEMPER AXLE PRODUCTS CORPORATION, Fonda, NY (US)

(72) Inventors: John E. Rode, Fonda, NY (US); Matthew Townes, Johnstown, NY (US)

(73) Assignee: TEMPLER AXLE PRODUCTS CORPORATION, Fonda, NY (US)

( * ) Notice: Subject to any disclaimer, the term of this patent is extended or adjusted under 35 U.S.C. 154(b) by 0 days.

(21) Appl. No.: 15/482,389

(22) Filed: Apr. 7, 2017

(51) Int. Cl.
F16C 25/06 (2006.01)
B25B 13/54 (2006.01)
F16B 39/12 (2006.01)
B60B 27/02 (2006.01)
B60B 27/00 (2006.01)

(52) U.S. Cl.
CPC .............. *F16C 25/06* (2013.01); *B25B 13/54* (2013.01); *F16B 39/12* (2013.01); *B60B 27/001* (2013.01); *B60B 27/02* (2013.01); *B60B 2380/14* (2013.01); *B60B 2900/321* (2013.01); *F16C 2229/00* (2013.01); *F16C 2326/02* (2013.01)

(58) Field of Classification Search
CPC .. F16C 25/06; F16C 2229/00; F16C 2326/02; F16B 39/12; B25B 13/54; B60B 2900/321; B60B 2380/14; B60B 27/001; B60B 27/02
See application file for complete search history.

(56) References Cited

U.S. PATENT DOCUMENTS

| | | | |
|---|---|---|---|
| 518,328 | A | 4/1894 | Oakey |
| 578,276 | A | 2/1897 | Strauss |

(Continued)

FOREIGN PATENT DOCUMENTS

| | | |
|---|---|---|
| AU | 2006200842 | 2/2006 |
| AU | 2007200331 | 1/2007 |

(Continued)

OTHER PUBLICATIONS

"Stemco Pro-Torq ® Advanced Axle Spindle Nuts 09-571-0006," Instruction guide, Copyright Aug. 2003, 2 pages.
"Timkin Products-Bearings," vol. 1, Issue 6; entitled "Why Oscillate or Rotate a Bearing", 2 pages, [http://www.timken.com/products/bearings/techtips/tip6.asp].

(Continued)

*Primary Examiner* — Ryan J Walters
(74) *Attorney, Agent, or Firm* — Heslin Rothenberg Farley & Mesiti P.C.; Nicholas Mesiti, Esq.; Victor A. Cardona, Esq.

(57) ABSTRACT

An apparatus for providing a load on a bearing mounted to a shaft which includes an attaching member releasably connectable to a shaft and a press mechanism coupled to the attaching member. The press mechanism is configured to provide a compressive load to the bearing. The press mechanism includes a wrench engageable with the lock nut on the shaft and the wrench is configured to engage and rotate the nut when the attaching member connects to the shaft. The wrench is moveable axially relative to an axial dimension of the press mechanism between a proximal non-engaged position and a distal engaged position such that the wrench engages the nut in the distal engaged position and the wrench avoids engaging the nut in a proximal non-engaged position. An aligning ring may be located around the attaching member and may be configured to engage a shaft slot.

17 Claims, 31 Drawing Sheets

(56) References Cited

U.S. PATENT DOCUMENTS

| | | |
|---|---|---|
| 1,352,643 A | 9/1920 | Young |
| 1,366,273 A | 1/1921 | Nettlefold |
| 1,373,489 A | 5/1921 | Royal-Cochran |
| 1,384,655 A | 7/1921 | Allmon |
| 1,440,938 A | 2/1923 | Sieroslawski |
| 1,755,807 A | 4/1930 | Boles |
| 1,758,515 A | 5/1930 | Heiermann |
| 1,813,640 A | 7/1931 | Rossetti |
| 2,301,786 A | 11/1942 | Millermaster |
| 2,426,219 A | 8/1947 | Jackson |
| 2,532,141 A | 11/1950 | Barkan et al. |
| 2,553,620 A | 5/1951 | Yeazell |
| 2,755,698 A | 7/1956 | Wurzel |
| 2,762,112 A | 9/1956 | Kylen |
| 2,769,360 A | 11/1957 | Woodford |
| 2,813,732 A | 11/1957 | Hird |
| 3,144,909 A | 8/1964 | Hart et al. |
| 3,241,409 A | 3/1966 | Raptis |
| 3,316,952 A | 5/1967 | Hollinger |
| 3,390,445 A | 7/1968 | Sova, Sr. |
| 3,464,474 A | 9/1969 | Jansen |
| 3,480,300 A | 11/1969 | Jeffrey et al. |
| 3,522,830 A | 4/1970 | Blizard |
| 3,566,721 A | 3/1971 | Nockleby |
| 3,581,609 A | 6/1971 | Greenwood |
| 3,620,108 A | 11/1971 | Door |
| 3,662,449 A | 5/1972 | Hashimoto |
| 3,664,226 A | 5/1972 | Gonzale |
| 3,678,981 A | 7/1972 | Heyworth |
| 3,705,524 A | 12/1972 | Greenwood |
| 3,742,568 A * | 7/1973 | Hahlbeck ............ B23P 19/10 29/252 |
| 3,762,455 A | 10/1973 | Anderson, Jr. |
| 3,844,323 A | 10/1974 | Anderson, Jr. |
| 3,986,750 A | 10/1976 | Trent et al. |
| 4,004,338 A | 1/1977 | Breitbach |
| 4,019,824 A | 4/1977 | Percy |
| 4,048,897 A | 9/1977 | Price, Jr. |
| 4,054,999 A | 10/1977 | Harbottle |
| 4,210,372 A | 7/1980 | McGee et al. |
| 4,305,438 A | 12/1981 | Spinosa et al. |
| 4,436,468 A | 3/1984 | Ozaki et al. |
| 4,476,750 A | 10/1984 | Murphy |
| 4,593,924 A | 6/1986 | Cabeza |
| 4,642,866 A | 2/1987 | Murtaugh |
| 4,689,865 A | 9/1987 | Chamblee |
| 4,812,094 A | 3/1989 | Grube |
| 4,958,941 A | 9/1990 | Imanari |
| 4,971,501 A | 11/1990 | Chavez |
| 5,007,313 A | 4/1991 | Jeromson, Jr. et al. |
| 5,011,306 A | 4/1991 | Martinie |
| 5,058,424 A | 10/1991 | O'Hara |
| 5,070,621 A | 12/1991 | Butler et al. |
| 5,125,156 A | 6/1992 | Witte |
| 5,129,156 A | 7/1992 | Walker |
| 5,180,265 A | 1/1993 | Weise |
| 5,251,995 A | 10/1993 | Chi |
| 5,348,349 A | 9/1994 | Sloane |
| 5,349,736 A | 9/1994 | Rubino et al. |
| 5,362,111 A | 11/1994 | Harbin |
| 5,366,300 A | 11/1994 | Deane et al. |
| 5,402,560 A | 4/1995 | Rode |
| 5,442,854 A | 8/1995 | Koltookian et al. |
| 5,533,849 A | 7/1996 | Burdick |
| 5,535,517 A | 7/1996 | Rode |
| 5,542,167 A | 8/1996 | Nakamoto |
| 5,573,311 A | 11/1996 | Clohessy |
| 5,597,058 A | 1/1997 | Ewer |
| 5,749,386 A | 5/1998 | Samuel, Jr. |
| 5,779,419 A | 7/1998 | Kellstrom et al. |
| 5,877,433 A | 3/1999 | Matsuzaki et al. |
| 5,882,044 A | 3/1999 | Sloane |
| 5,934,853 A | 8/1999 | Junkers |
| 6,042,273 A | 3/2000 | Thrasher |
| 6,058,767 A | 5/2000 | Calvin |
| 6,065,920 A | 5/2000 | Becker et al. |
| 6,095,735 A | 8/2000 | Weinstein et al. |
| 6,135,642 A | 10/2000 | Burch |
| 6,145,417 A | 11/2000 | Bates et al. |
| 6,186,032 B1 | 2/2001 | Raines |
| 6,257,105 B1 | 7/2001 | Lin |
| 6,286,374 B1 | 9/2001 | Kudo et al. |
| D458,099 S | 6/2002 | Ruszczyk |
| 6,415,489 B1 | 7/2002 | Martins et al. |
| 6,471,774 B1 | 10/2002 | Krueger |
| 6,520,710 B2 | 2/2003 | Wells |
| 6,598,500 B1 | 7/2003 | Chivington-Wells |
| 6,601,503 B2 | 8/2003 | Scholzig et al. |
| 6,622,397 B1 | 9/2003 | Knoble |
| 6,637,297 B1 | 10/2003 | Mlynarczyk |
| 6,665,918 B1 | 12/2003 | Williams |
| 6,736,544 B1 | 5/2004 | DeWald |
| 6,749,386 B2 | 6/2004 | Harris |
| 6,783,137 B2 | 8/2004 | Nagreski et al. |
| 6,857,665 B2 | 2/2005 | Vyse et al. |
| 6,886,227 B1 | 5/2005 | Hedrick |
| 6,971,802 B2 | 12/2005 | Vezina |
| 6,976,816 B2 | 12/2005 | Slesinksi et al. |
| 6,976,817 B1 | 12/2005 | Grainger |
| 6,983,677 B1 | 1/2006 | Engel |
| 6,988,832 B2 | 1/2006 | DeWachter |
| 7,055,413 B1 | 6/2006 | Wang |
| 6,993,852 B2 | 7/2006 | Russell et al. |
| 7,194,936 B2 | 3/2007 | Engel et al. |
| 7,226,259 B2 | 6/2007 | Harris |
| 7,270,509 B2 | 9/2007 | Disantis et al. |
| 7,303,367 B2 | 12/2007 | Rode |
| 7,343,836 B1 | 3/2008 | Ward |
| 7,346,985 B1 | 3/2008 | Strait |
| 7,389,579 B2 | 6/2008 | Rode |
| 7,428,779 B2 | 9/2008 | Smith et al. |
| 7,448,301 B1 | 11/2008 | Cronin |
| 7,559,135 B2 | 7/2009 | Rode |
| 7,625,164 B2 | 12/2009 | Rode |
| 7,757,586 B2 | 7/2010 | Winker et al. |
| 7,927,052 B1 | 4/2011 | Varden |
| 8,006,573 B1 | 8/2011 | Rode |
| 8,016,531 B2 | 9/2011 | White et al. |
| 8,172,496 B2 | 5/2012 | Vile et al. |
| 8,292,373 B2 | 10/2012 | Rieger et al. |
| 8,316,530 B2 | 11/2012 | Rode |
| 8,328,486 B2 | 12/2012 | Cox |
| 8,347,471 B2 | 1/2013 | Wang |
| 8,359,733 B2 | 1/2013 | Rode |
| 8,534,770 B2 | 9/2013 | White |
| 8,650,757 B2 | 2/2014 | Rode |
| D706,104 S | 6/2014 | Mooney |
| 8,904,646 B2 | 12/2014 | Rode |
| 8,919,227 B2 | 12/2014 | Tseng |
| 8,961,090 B2 | 2/2015 | Rode |
| 9,156,150 B2 | 10/2015 | Wang |
| 9,200,672 B2 | 12/2015 | Rode |
| 9,200,673 B2 | 12/2015 | Rode |
| 9,217,461 B2 | 12/2015 | Rode et al. |
| 9,566,699 B1 | 2/2017 | Rode et al. |
| 9,574,612 B2 | 2/2017 | Rode |
| 9,574,962 B2 | 2/2017 | Preuss et al. |
| 9,587,667 B2 | 3/2017 | Rode |
| 9,599,164 B1 | 3/2017 | Rode et al. |
| 9,618,049 B2 | 4/2017 | Rode |
| 9,651,094 B2 | 5/2017 | Rode |
| D789,169 S | 6/2017 | Rode et al. |
| 9,764,453 B1 | 9/2017 | Rode et al. |
| 9,797,441 B2 | 10/2017 | Rode |
| 9,850,943 B1 | 12/2017 | Rode |
| 9,909,609 B2 | 3/2018 | Rode et al. |
| 2004/0089113 A1 | 5/2004 | Morgan |
| 2016/0053806 A1* | 2/2016 | Rode ............ B25B 27/062 29/724 |
| 2017/0268572 A1 | 9/2017 | Rode et al. |
| 2017/0320203 A1 | 11/2017 | Rode et al. |

(56) References Cited

U.S. PATENT DOCUMENTS

2017/0326714 A1 11/2017 Rode et al.
2018/0045244 A1 2/2018 Rode

FOREIGN PATENT DOCUMENTS

| | | |
|---|---|---|
| AU | 2007234534 | 11/2007 |
| AU | 2008201252 | 3/2008 |
| AU | 2011204889 | 7/2011 |
| CA | 2576337 | 7/2007 |
| CA | 2863789 | 7/2007 |
| CA | 2993836 A1 | 7/2007 |
| CA | 2537611 | 8/2007 |
| CA | 2704865 | 12/2010 |
| CN | 102699875 A | 10/2012 |
| DE | 555123 C | 7/1932 |
| DE | 1962186 A1 | 6/1970 |
| DE | 3905385 A1 | 8/1990 |
| DE | 102007005160 | 8/2007 |
| DE | 102006011122 A1 | 9/2007 |
| DE | 102010017610 A2 | 3/2011 |
| EP | 1367299 A2 | 12/2003 |
| EP | 3122512 A1 | 2/2017 |
| GB | 990553 A | 4/1965 |
| GB | 2286231 A | 2/1995 |
| GB | 2435499 B | 1/2008 |
| GB | 2445501 A | 7/2008 |
| GB | 2434621 B | 10/2008 |
| GB | 2471365 A | 12/2010 |
| IT | 1401730 B1 | 8/2013 |
| WO | 02/08618 A1 | 1/2002 |
| WO | 2015/147903 A1 | 10/2015 |

OTHER PUBLICATIONS

Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/Vol6No3.pdf#search='Bearing%20Preload1.

"Forming and Shaping Processes Compaction and Sintering (Pulvepresning)," Copyright Institut for Precesteknik Danmarks Tekniske Universitet 1996, (http://www.ipt.dtusdk/—ap/ingpro/forming/ppm/htm).

Stemco, Pro-Torq, An Axle Spindle Nut System for Today's Fleets. Mar. 2003; download from http://www.sicinco.com, pp. 38-41.

Stemco, Pro-Torq, An Axle Spindle Nut System for Today's Fleets. Mar. 2003; download from http://www.stemco.com, pp. 57-64.

What is Powder Metallurgy? Dec. 2004, 2 pages. (https://www.mpif.org/technology/whatis.html).5011306.

Stemco, Quick Reference Catalog 572-0011 Rev. Date Apr. 2010.

Stemco—Pro-Torq, Axle Spindle Nuts, An Axle Spindle Nut System for Today's Commercial Fleets (http://www.stemco.com/product/pro-torz-axle-spindle-nuts/.

"Stemco Pro-Torq(R) 571-2970," Copyright 2005 Stemco LP, 2 pages.

PCT/ISA/220—Notification of Transmittal of the International Search Report and the Written Opinion of the International Searching Authority, or the Delaration, dated Jul. 30, 2018, for corresponding PCT International Application No. PCT/US2018/026525.

PCT/ISA/210—International Search Report, dated Jul. 30, 2018, for corresponding PCT International Application No. PCT/US2018/026525.

PCT/ISA/237—Written Opinion of the International Searching Authority, dated Jul. 30, 2018, for corresponding PCT International Application No. PCT/US2018/026525.

\* cited by examiner

SYSTEMS AND METHODS FOR PRELOADING A BEARING AND ALIGNING A LOCK NUT

CROSS-REFERENCE TO RELATED APPLICATION

This application is related to U.S. Ser. No. 15/482,395 filed Apr. 7, 2017, entitled "Systems and Methods for Preloading a Bearing and Aligning a Lock Nut", the entire disclosure of which is incorporated herein by reference.

This application is related to U.S. Ser. No. 15/482,413 filed Apr. 7, 2017, entitled "Systems and Methods for Preloading a Bearing and Aligning a Lock Nut", the entire disclosure of which is incorporated herein by reference.

This application is related to U.S. Ser. No. 15/482,416 filed Apr. 7, 2017, entitled "Systems and Methods for Preloading a Bearing and Aligning a Lock Nut", the entire disclosure of which is incorporated herein by reference.

This application is related to U.S. Ser. No. 12/492,826 filed on Jun. 26, 2009, entitled "Systems and Methods for Preloading a Bearing and Aligning a Lock Nut", now U.S. Pat. No. 8,316,530 issued on Nov. 27, 2012, the entire disclosure of which is incorporated herein by reference.

This application also relates to U.S. Ser. No. 13/683,571, filed on Nov. 21, 2012, entitled "Methods for Preloading a Bearing and Aligning a Lock Nut", now U.S. Pat. No. 8,650,757 issued on Feb. 18, 2014, the entire disclosure of which is incorporated herein by reference.

This application also relates to U.S. Ser. No. 14/160,045, filed on Jan. 21, 2015, entitled "Systems and Methods for Preloading a Bearing and Aligning a Lock Nut", now U.S. Pat. No. 8,904,646 issued on Dec. 9, 2014, the entire disclosure of which is incorporated herein by reference.

This application also relates to U.S. application Ser. No. 11/341,948, filed Jan. 27, 2006, and titled "Method and Apparatus for Preloading a Bearing", issued as U.S. Pat. No. 7,559,135 on Jul. 14, 2009, the entire disclosure of which is incorporated herein by reference.

This application also relates to U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, the entire disclosure of which is incorporated herein by reference.

This application also relates to U.S. Ser. No. 12/033,548, filed on Feb. 19, 2008, entitled "Axle Nut", now U.S. Pat. No. 8,961,090 issued on Feb. 24, 2015, the entire disclosure of which is incorporated herein by reference.

This application also relates to U.S. Ser. No. 12/492,926, filed Jun. 26, 2009, entitled "Methods for Preloading a Bearing", now U.S. Pat. No. 8,359,733 issued on Jan. 29, 2013, the entire disclosure of which is incorporated herein by reference.

This application also relates to U.S. Ser. No. 14/305,830, filed Jun. 16, 2014, entitled "Lock Nut System", now U.S. Pat. No. 9,200,673 issued on Dec. 1, 2015, the entire disclosure of which is incorporated herein by reference.

This application also relates to U.S. Ser. No. 14/305,673, filed Jun. 16, 2014, entitled "Method, Apparatus, and Nut for Preloading A Bearing", now U.S. Pat. No. 9,200,672 issued on Dec. 1, 2015, the entire disclosure of which is incorporated herein by reference.

This application also relates to U.S. Ser. No. 14/814,086, filed Jul. 30, 2015, entitled "Apparatus for Preloading A Bearing", now U.S. Pat. No. 9,618,049 to issue on Apr. 11, 2017, the entire disclosure of which is incorporated herein by reference.

This application also relates to U.S. Ser. No. 14/852,100, filed Sep. 11, 2015, entitled "Method, Apparatus, and Nut for Bearing", published as US 2016-0053806 A1 on Feb. 25, 2016, the entire disclosure of which is incorporated herein by reference.

This application also relates to U.S. Ser. No. 14/952,663, filed Nov. 25, 2015, entitled "Method, Apparatus, and Nut for Preloading A Bearing", now U.S. Pat. No. 9,574,612 issued on Feb. 21, 2017, the entire disclosure of which is incorporated herein by reference.

This application also relates to U.S. Ser. No. 15/441,520, filed Feb. 24, 2017, entitled "Apparatus for Preloading A Bearing", the entire disclosure of which is incorporated herein by reference.

This application is also related to U.S. Ser. No. 14/533,143, filed on Aug. 8, 2014, entitled "Systems and Methods for Preloading A Bearing and Aligning A Lock Nut", now U.S. Pat. No. 9,217,461 issued on Dec. 22, 2015, the entire disclosure of which is incorporated by reference).

This application is also related to U.S. Ser. No. 14/946,168, filed on Nov. 19, 2015, entitled "Systems and Methods for Preloading A Bearing and Aligning A Lock Nut", now U.S. Pat. No. 9,587,667 issued on Mar. 7, 2017, the entire disclosure of which is incorporated by reference).

This application is also related to U.S. Ser. No. 15/418,315, filed on Jan. 27, 2017, entitled "Systems and Methods for Preloading A Bearing and Aligning A Lock Nut", the entire disclosure of which is incorporated by reference).

This application also relates to U.S. Ser. No. 15/071,584, filed Mar. 16, 2016 entitled "Systems and Methods for Preloading a Bearing", to issue as U.S. Pat. No. 9,599,164 on Mar. 21, 2017, the entire disclosure of which is incorporated herein by reference.

This application also relates to U.S. Ser. No. 29/558,261, filed Mar. 16, 2016 entitled "Retaining Ring Pliers", the entire disclosure of which is incorporated herein by reference.

This application also relates to U.S. Ser. No. 15/416,683, filed Jan. 26, 2017 entitled "Systems and Methods for Preloading A Bearing", the entire disclosure of which is incorporated herein by reference.

This application also relates to U.S. Ser. No. 15/071,753, filed Mar. 16, 2016, entitled "System and Methods for Preloading a Bearing", the entire disclosure of which is incorporated herein by reference.

This application also relates to U.S. Ser. No. 15/153,020, filed on May 12, 2016, entitled "Systems and Methods for Preloading a Bearing and Installing a Tamper Indicating Member", now U.S. Pat. No. 9,566,699 issued on Feb. 14, 2017, the entire disclosure of which is incorporated herein by reference.

This application also relates to U.S. Ser. No. 15/399,473, filed on Jan. 5, 2017, entitled "Systems and Methods for Preloading a Bearing and Installing a Tamper Indicating Member", the entire disclosure of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

It is important that teeth of a locking member engage teeth of the lock nut such that the locking member is positioned to allow it to engage a slot of the shaft. The nut must be aligned to allow such engagement by selective rotation of the nut to a particular position such that the teeth of the nut and the teeth of the locking member when engaged allow an engaging portion of the locking member to engage a slot of the shaft. Rotation of the nut may be performed during the preloading of a bearing and the degree of rotation allowed may depend on the amount of compressive force applied to a bearing or hub during the preloading of the bearing and the method of application of such force.

The rotation of the nut as described may be impaired in a drive axle or other system in which a lock nut is surrounded such that it is difficult to access outside portions of the nut to tighten and/or loosen the nut to a proper position using a standard wrench or manually by a user.

Thus, a need exists for providing accurate and repeatable procedures and devices for providing and adjusting bearing preload and for adjusting lock nut systems configured to retain preloaded bearings.

SUMMARY OF THE INVENTION

The present inventor provides, in a first aspect, an apparatus for providing a load on a bearing mounted to a shaft which includes an attaching member releasably connectable to a shaft and a press mechanism coupled to the attaching member. The press mechanism is configured to provide a compressive load to the bearing. The press mechanism includes a wrench engageable with the lock nut on the shaft and the wrench is configured to engage and rotate the nut when the attaching member connects to the shaft. The wrench is moveable axially relative to an axial dimension of the press mechanism between a proximal non-engaged position and a distal engaged position such that the wrench engages the nut in the distal engaged position and the wrench avoids engaging the nut in a proximal non-engaged position.

The present invention provides, in a second aspect, a method for use in providing a load on a bearing mounted to a shaft which includes mounting an attaching mechanism to an end of the shaft. A press mechanism is coupled to the attaching member and is configured to provide a compressive load to the bearing. A wrench is moved axially relative to an axial dimension of the press mechanism between a proximal non-engaged position and a distal engaged position such that the wrench engages the lock nut on the shaft in the distal engaged position.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, system and methods for adjusting bearings mounted on a shaft and aligning lock nuts for retaining such bearings are provided.

Figure 1:
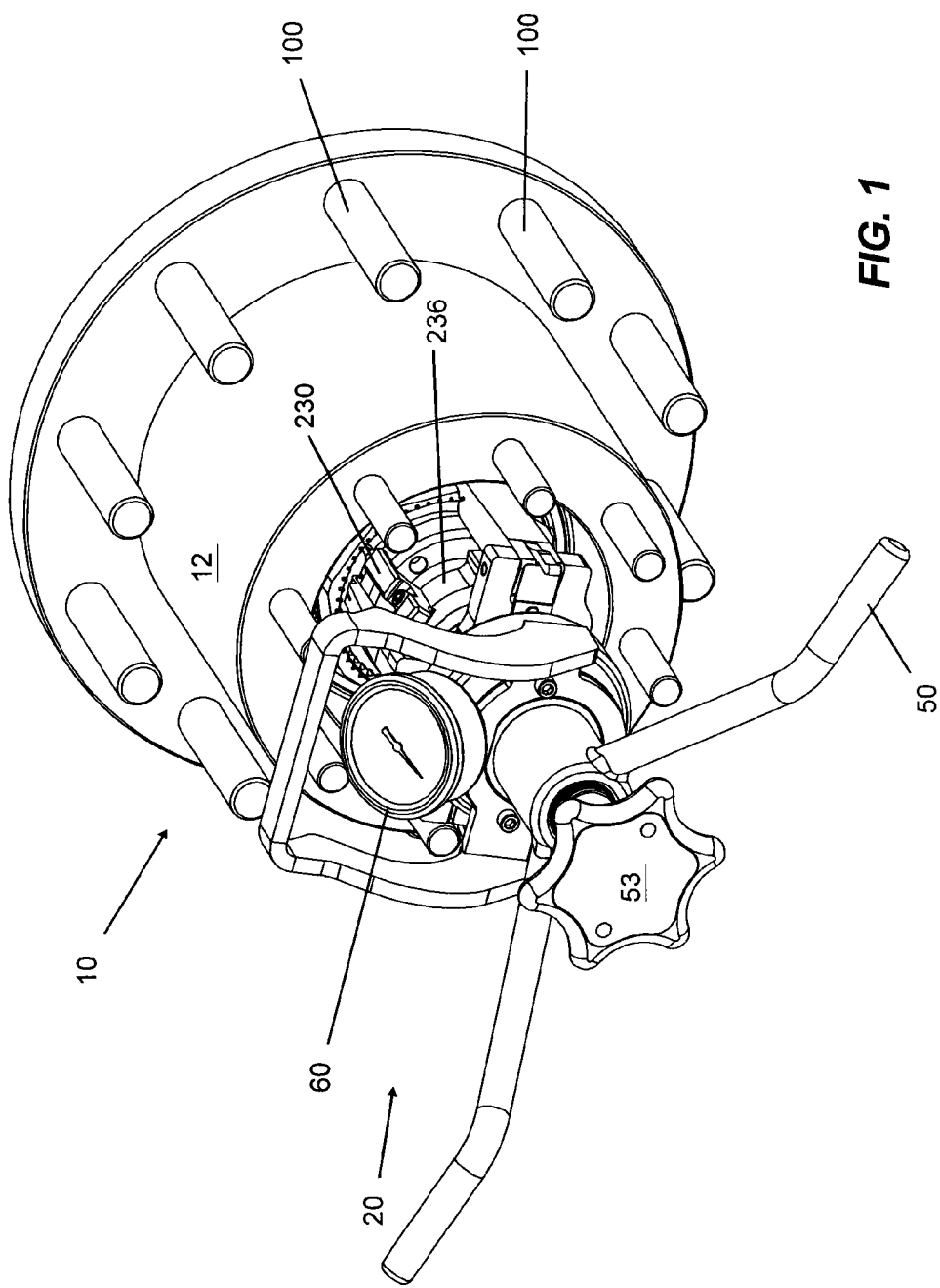
FIG. 1 is a perspective view of a wheel hub assembly engaging a bearing preload apparatus according to one aspect of the invention.
Figure 2:
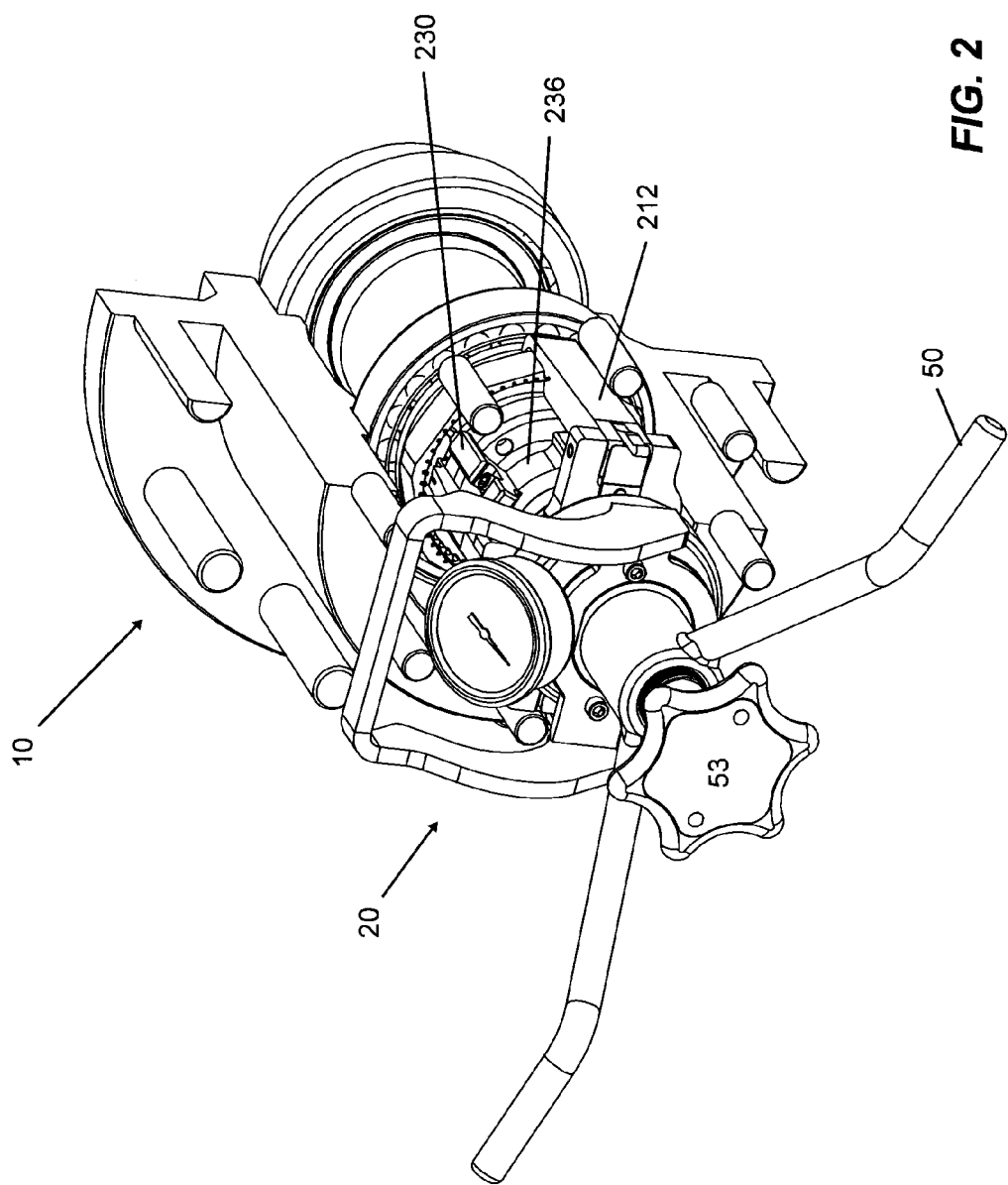
FIG. 2 is a perspective view, partially in cross section of a portion of the assembly shown in FIG. 1.

In an exemplary embodiment depicted in FIG. 1, a wheel hub assembly 10 engages a bearing preload apparatus 20. In FIG. 2, some of a section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

Figure 3:
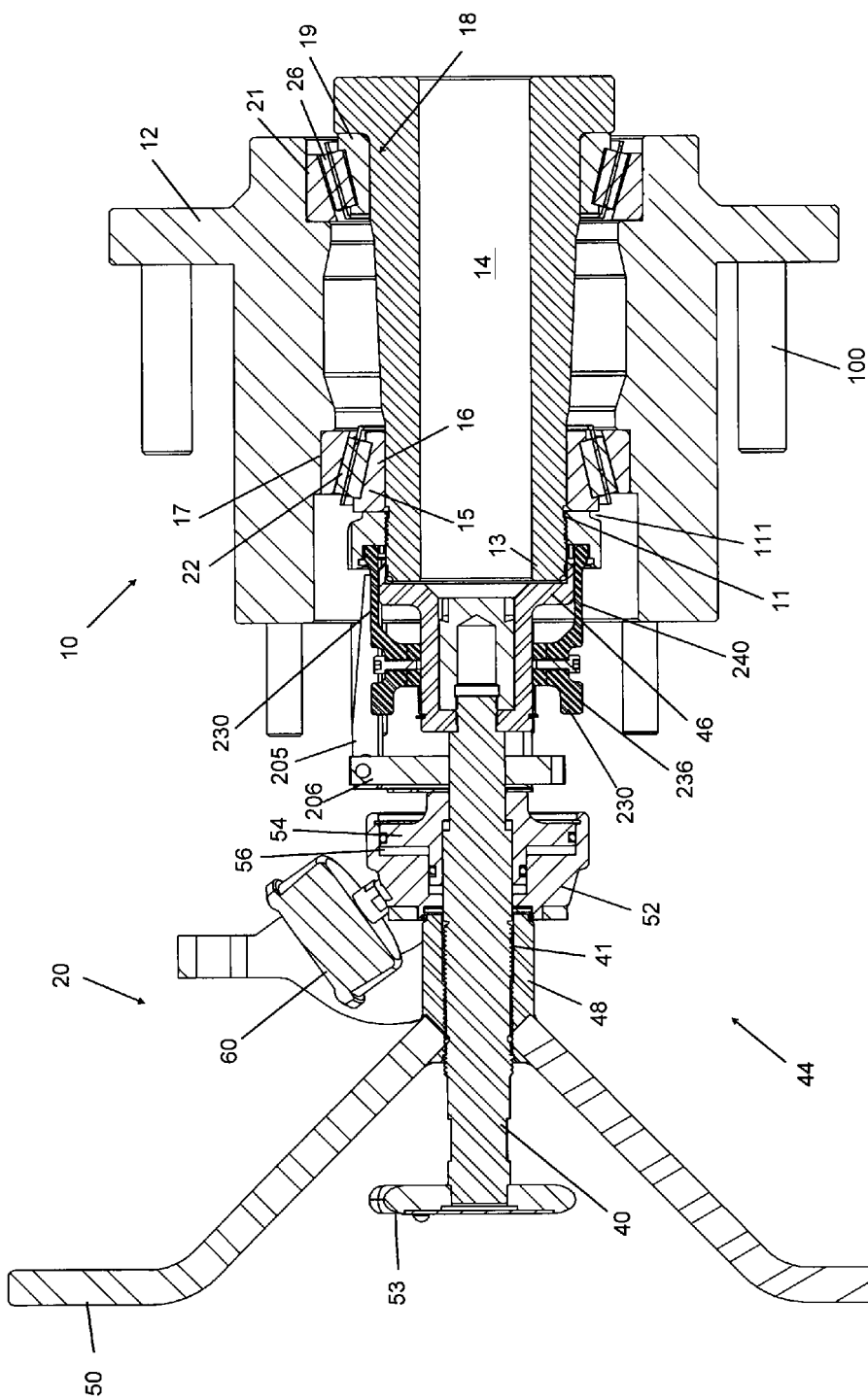
FIG. 3 is a side cross-sectional view of the assembly of FIG. 1.

As shown in FIG. 1-3, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

As shown in FIGS. 1-3, as is typical of bearings, an outboard bearing 16 includes an inner race (or cone) 15, an outer race (or cup) 17, a plurality of rollers 22, and a roller cage. Similarly, an inboard bearing 18 includes an inner race (or cone) 19, an outer race (or cup) 21, a plurality of rollers 26, and roller cage. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Pat. No. 7,559,135, issued Jul. 14, 2009 (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 1-3 and 8-9, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Pat. No. 7,559,135, issued Jul. 14, 2009 (application Ser. No. 11/341, 948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Figure 8:
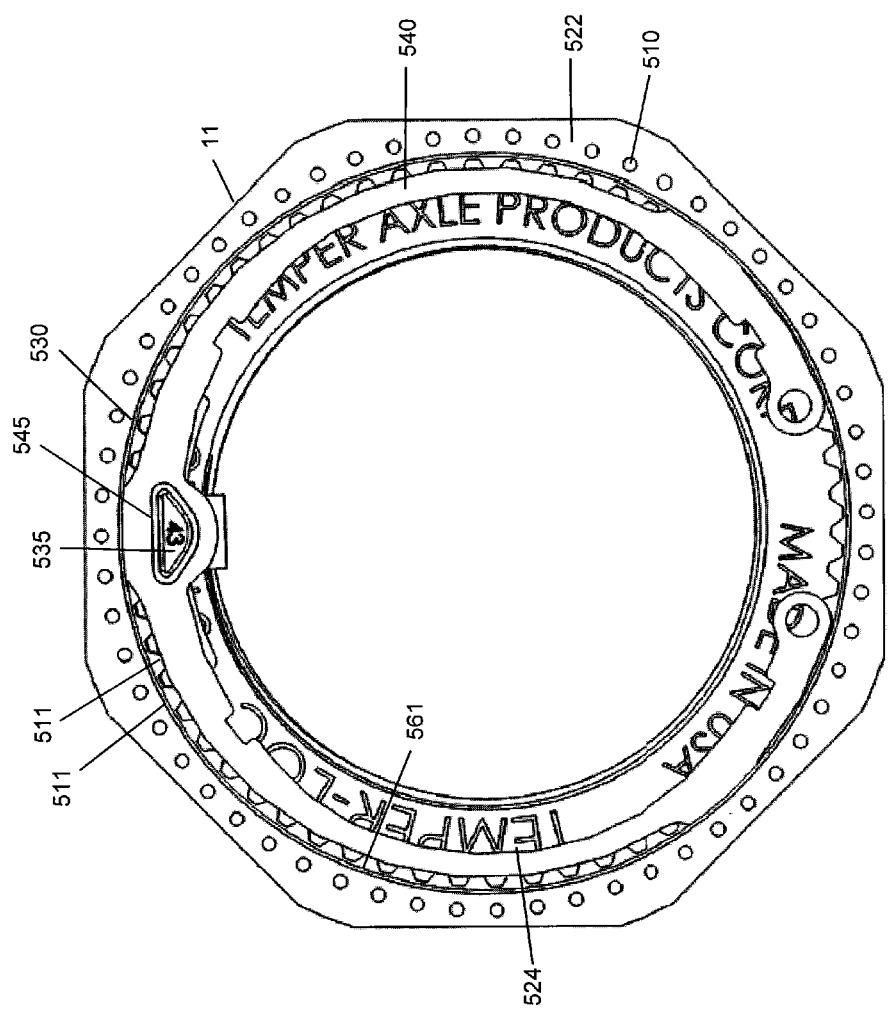
FIG. 8 is an elevational view of a lock nut system which includes a lock nut having a keeper and a keeper retaining member engaged with the nut according to an aspect of the present invention.
Figure 9:
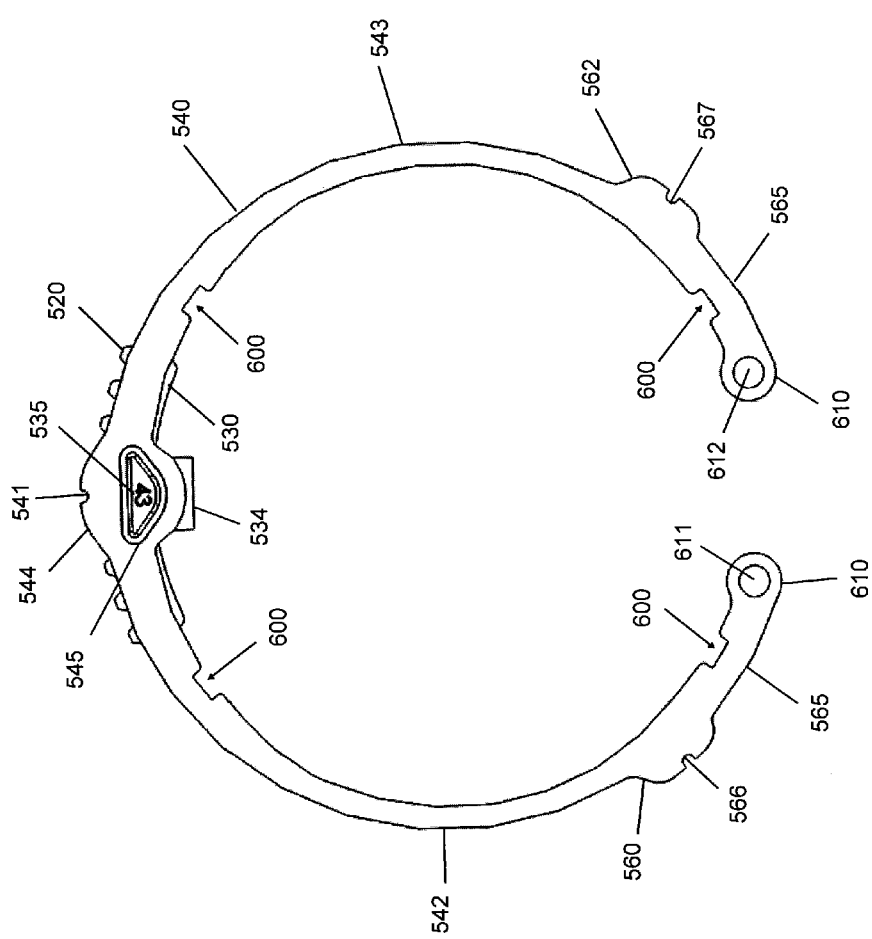
FIG. 9 is an elevational view of the keeper retaining member of FIG. 8.

As depicted in FIGS. 8-9, a keeper 530 is engageable with retaining nut 11 and is connected to a keeper retaining member 540. A projection 535 of keeper 530 extends through an opening 545 in retaining member 540 when connected. Projection 535 extends substantially perpendicular to a plane of retaining member 540. Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIG. 18), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. First leg 542 may also include a gripping member 568 and second leg 543 may include a second gripping member 569. The gripping members are substantially parallel to one another and are aligned at about 90 degrees from a plane of retaining member 540. A user may move the legs (i.e., first leg 542 and second leg 543) toward one another as described above to allow the retaining member to be received in slot 561. In one example, a user may use a tool (e.g., a tool made for this specific purpose or a type of pliers such as needle nose pliers) which is inserted into openings 611 and 612 (FIG. 5) to allow the tool to grip the legs to move ends 610 toward one another thereby allowing the legs to be inserted into slot 561. In an example a tool, such as a tool 7 disclosed in co-owned U.S. Ser. No. 15/071,584, filed Mar. 16, 2016, entitled "Systems and Methods for Preloading a Bearing", could be utilized to grip the legs.

Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. Further, protruding portion 560 may include a groove 566 and protruding portion 562 may include a groove 567. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to be received in slot 561 and to be connected to keeper 540 via projection 535. Further, keeper 530 may be formed or molded of powdered metal, for example. Alternatively, keeper 530 and retaining member 540 could be formed integral or monolithic relative to one another.

Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on end 241 of nut 220 may be hardened, for example, induction hardened.

Returning to FIGS. 1-7, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment nut 48 which may be threaded to rod 40 (e.g., on external threads 41) to mount press mechanism 44 to rod 40 and may provide a compressive load to press mechanism 44. Nut 48 may be adapted to facilitate rotation of nut 48, for example, nut 48 may include arms 50 and/or a hand wheel 53 that can assist a mechanic while manually tightening or untightening nut 48. In one aspect, nut 48 may be adapted to be rotated by an automated tool, for example, a drill or stepper motor (not shown). For example, nut 48 may be fashioned with a hex head or threads to engage an automated tool, for example, a torque motor (not shown).

Figure 4:
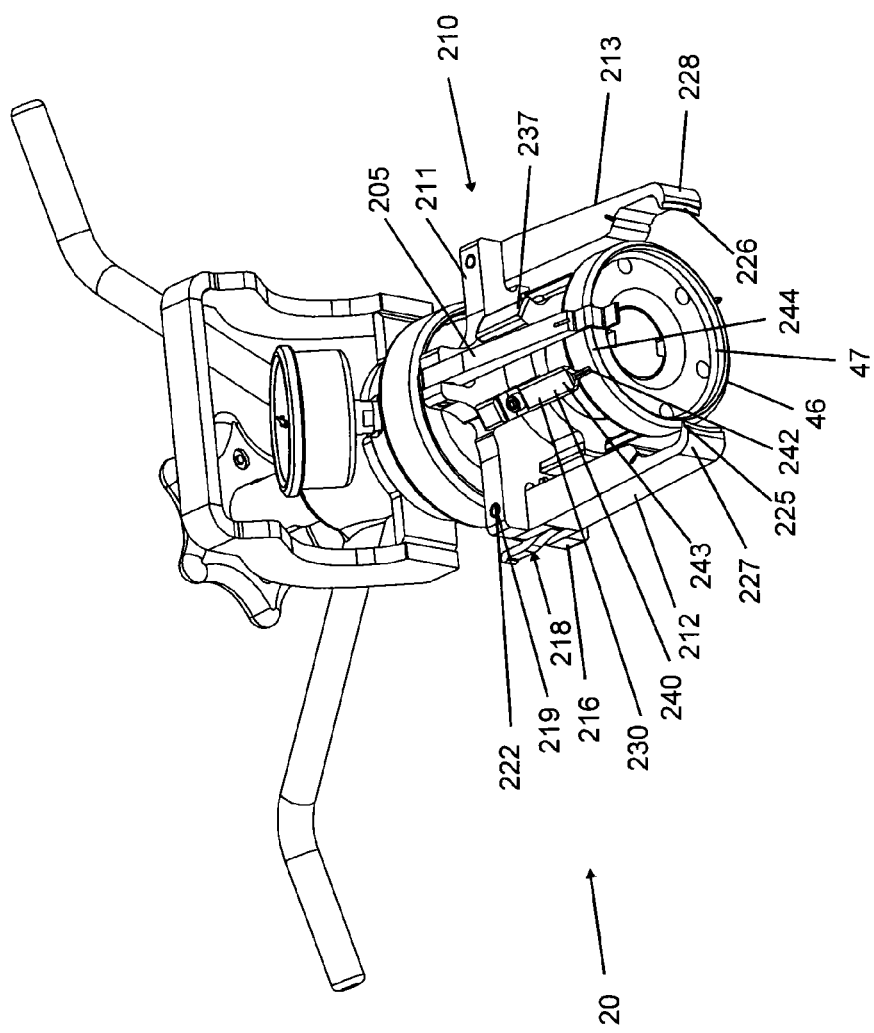
FIG. 4 is a front end perspective view of the assembly of FIG. 1 with a wrench thereof in a first position.
Figure 5:
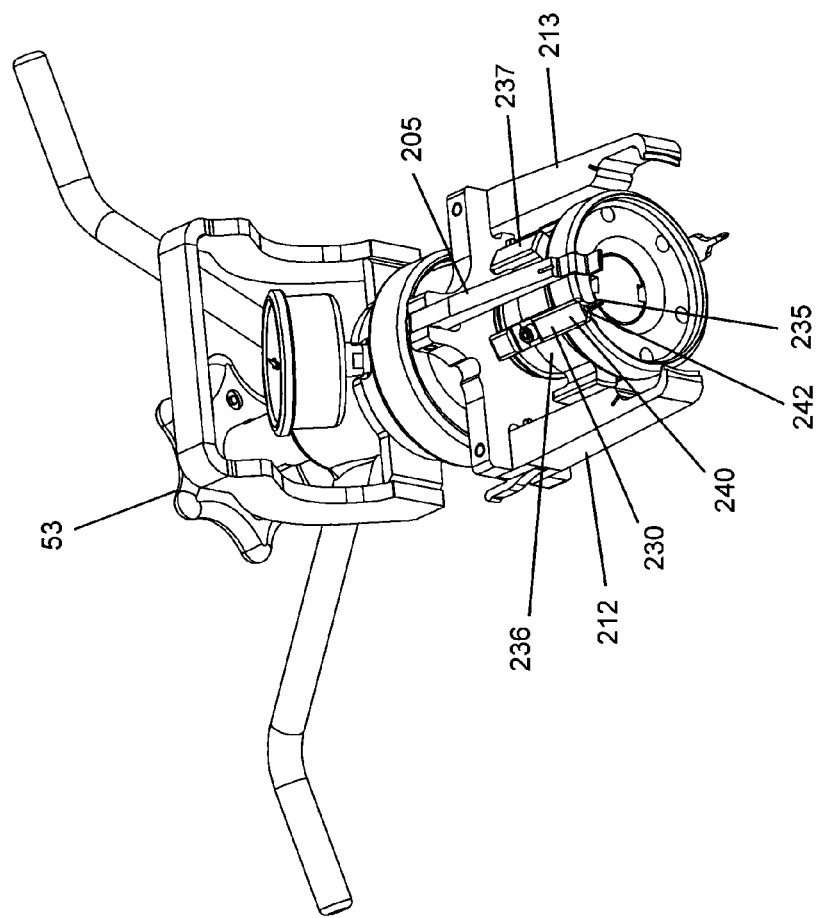
FIG. 5 is a front end perspective view of the assembly of FIG. 4 with the wrench thereof in a second position.
Figure 6:
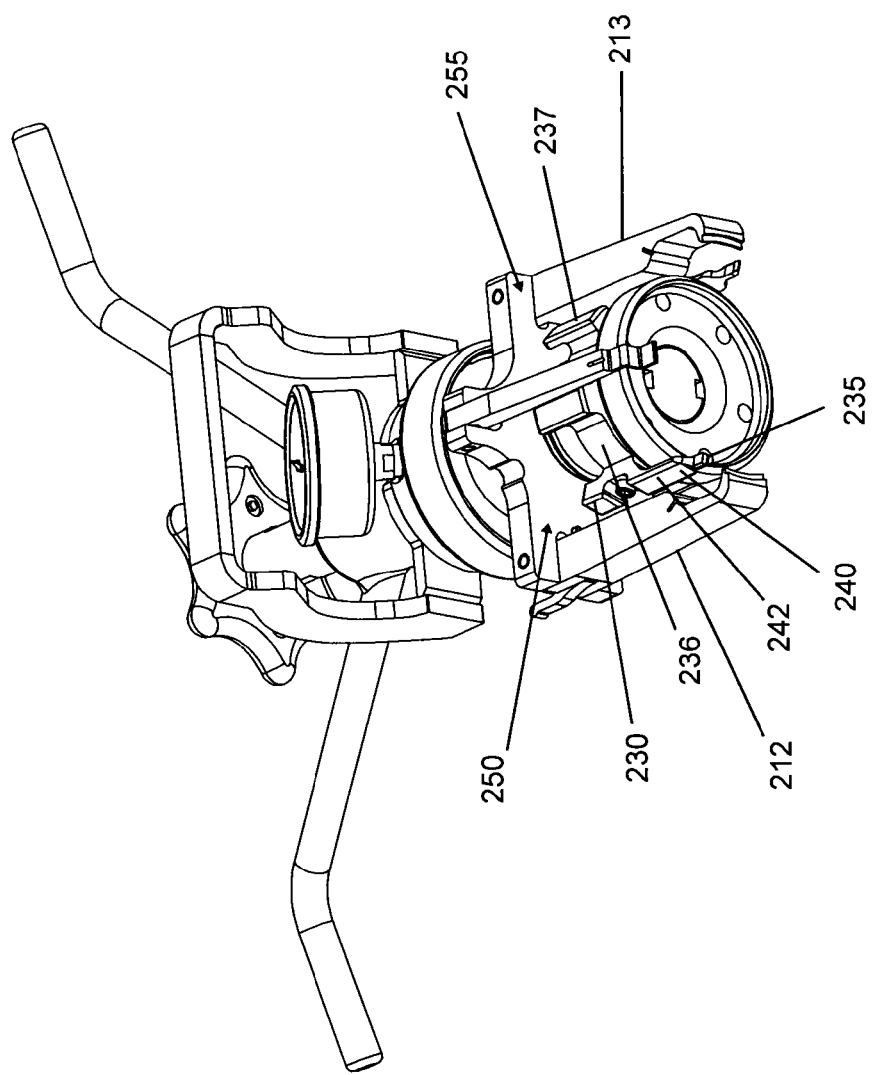
FIG. 6 is a front end perspective view of the assembly of FIG. 5 with the wrench thereof in a third position.
Figure 10:
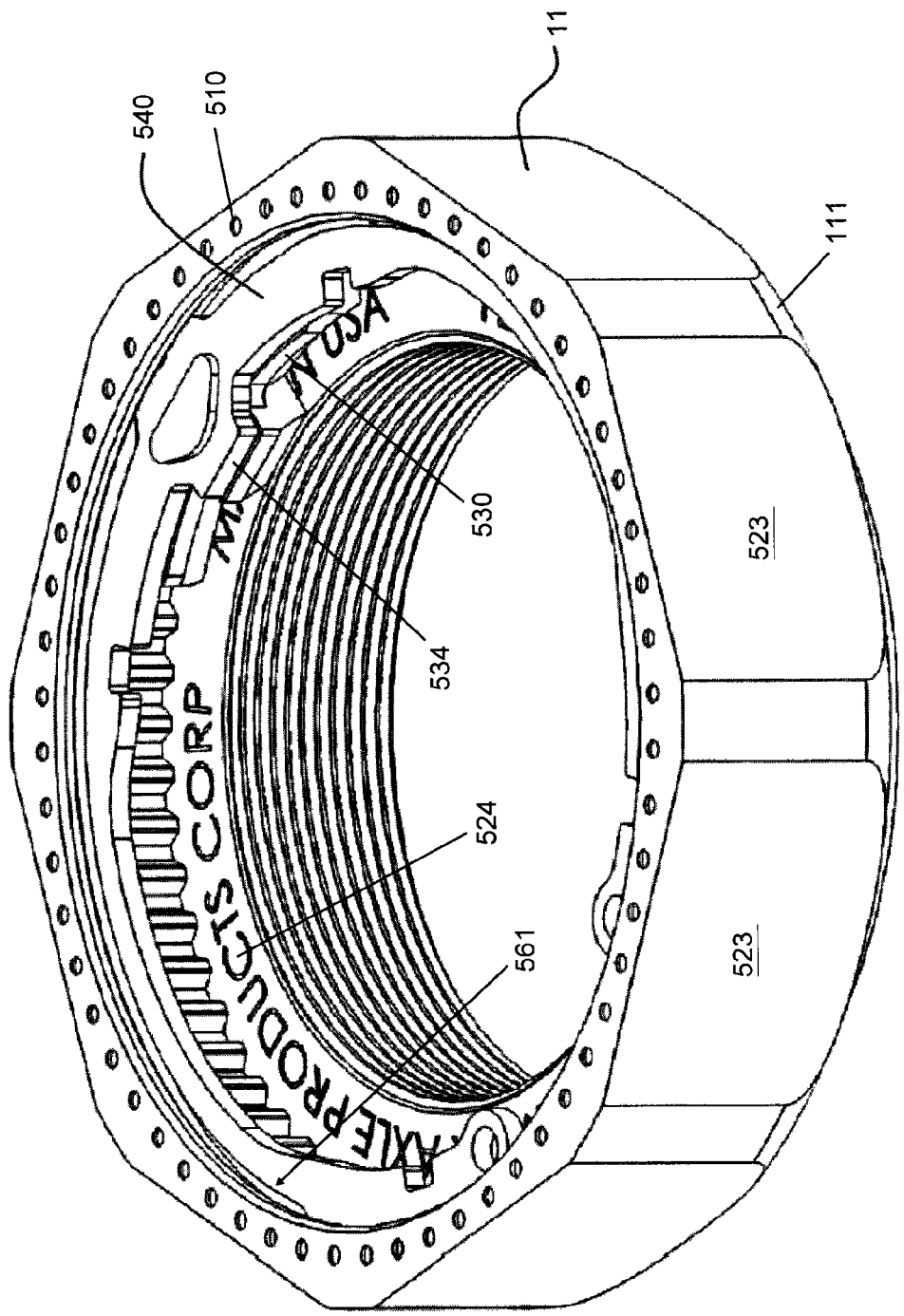
FIG. 10 is a perspective view of the lock nut system of FIG. 8.

As shown in FIGS. 4-6 (and co-owned U.S. Pat. No. 8,650,757, issued on Feb. 18, 2014), press mechanism 44 includes a loading adapter 210. A compressive load from press mechanism 44 (e.g., from nut 48 thereof) is transmitted to bearing 16, and to bearing 18, by loading adapter 210. Further, loading adapter 210 works in conjunction with retaining nut 11 to provide a load to outboard bearing 16 (e.g., an inner race (not shown) thereof). Retaining nut 11 may have a recess that exposes the surface of inner race 15 and permits contact by, for example, loading adapter 210. For example, as depicted in FIGS. 3 and 10, nut 11 may have a bottom curve or recessed portion 111 such that a bottom end of nut 11 has a smaller diameter than the remainder thereof. Loading adapter 210 may thus transmit the compressive load from press mechanism 44 (i.e., around nut 11) to bearing 16. In an unillustrated example, bearing 16 could be exposed thereby allowing load adapter 210 to be used with a conventional axle nut, as shown for example in FIG. 3 of co-owned application, U.S. Pat. No. 7,389,579 issued Jun. 24, 2008 (application Ser. No. 11/354,513, filed Feb. 15, 2006), and entitled "Method, Apparatus, And Nut For Preloading A Bearing". However, when bearing 16 would be concealed by such a conventional axle nut, retaining nut 11 may be used instead thereof according to aspects of the invention.

As depicted in FIGS. 4-6, loading adapter 210 includes a plate 211 and at least two extensions, fingers, or arms 212, 213 extending from plate 211. In this aspect of the invention, extensions 212 and 213 are adapted to transmit the load applied to plate 211, for example, by the compression of nut 48, to the bearing 16. Plate 211 typically includes a through hole or bore (not shown) that is adapted to receive rod 40. In one aspect, extensions 212 and 213 may be moveable or deflectable to facilitate assembly of adapter 210 into engagement with bearing 16. For example, extensions 212 and 213 may include any interface with plate 211 or modification to extensions 212 and 213 that permits extensions 212 and 213 to deflect to avoid interference with nut 11. Extensions 212 and 213 may be pivotally mounted to plate 211. Plate 211 may include two pairs of oppositely extending lugs or projections 216 having through holes 219, and projections 216 may include recesses 218 configured (e.g., shaped and dimensioned) to receive extensions 212 and 213. Pins 222 may be provided in holes 219 in projections 216 that engage holes (not shown) in extensions 212 and 213 whereby extensions 212, 213 may rotate about pins 222.

Arms or extensions 212, 213 may include projections 225, 226, respectively, for example, arcuate projections adapted to engage the arcuate shape of bearing 16 (e.g., an inner race thereof). Arcuate projections 225, 226 may be radiused to provide the same curvature of bearing 16, for example, a radius of between about 1¼ inches and about 5 inches. Projections 225, 226 may include shoulders 227, 228, respectively, to assist in engaging bearing 16. In one aspect, since pins 222 (which transmit the load from plate 211 to extensions 212, 213) may be located at a greater radial distance from the center of shaft 14 than the radial distance to the point of contact on bearing 16 (see FIG. 4), shoulders 227, 228 may be provided to minimize or prevent contact of projections 225, 226 with nut 11. This aspect of the invention may ensure that the compressive load applied by press mechanism 44 is transmitted to bearing 16 and not borne by nut 11. Minimizing or preventing contact between extensions 212, 213 and nut 11 also permits nut 11 to be freely rotated without contact with extensions 212, 213.

Loading adapter 210 may also include an aligning arm 205 configured (e.g., shaped and dimensioned) to engage shaft slot 5 (FIG. 18) of spindle 14. Aligning arm 205 may be pivotally connected to a connecting member 206 of plate 211. A pin may connect arm 205 to opposing portions of connecting member 206. Aligning arm 205 may be utilized by a user as a reference point relative to retaining nut 11. In particular, retaining nut 11 may include one or more markings 510 corresponding to one or more roots 512 (i.e., low points equidistant between each pair of engaging teeth) of engaging teeth 511 thereof as depicted in FIG. 8. For example, the markings may be circular indentations in the nut. The location of such markings on outside surface 522 of nut 11 allows a user to selectively rotate the nut relative to aligning arm 205 (e.g., when pressure is applied to bearing 16 by press mechanism 44 to allow rotation of nut 11) to an engaging position where the arm is at a desired position (e.g., at a location where a line on the arm is aligned with one of the markings on the nut) relative to one or more of markings 510. In such position, engaging teeth 511 may be properly engaged with keeper teeth 520 such that radially inner side 534 engages shaft slot 5 of spindle 14, i.e., after preload apparatus is removed and keeper 530 and keeper retaining member 540 engage nut 11. Further, keeper retaining member 540 may include a notch 541 in a nose 544 thereof with the notch being located at about a geometrical central point of keeper retaining member 540 (e.g., on an axis of symmetry thereof) such that an equal amount of retaining member 540, such as first leg 542, is one side thereof while the remainder of retaining member 540, such as second leg 543, is on another side thereof. Further, keeper 530 may be centered on keeper retaining member 540 such that a central engaging tooth 570 is aligned with notch 541. Also, retaining member 540 may be placed in slot 561 such that engaging tooth 570 engages a tooth root aligned with a marking of markings 510 to which notch 541 is aligned. Alternatively, markings 510 could correspond to a different feature of nut 11 (i.e., besides the roots between teeth 511) to facilitate the engagement of nut 11 with keeper 530 and/or keeper 530 with shaft slot 5 of spindle 14.

A shape of aligning arm 205 allows it to extend through nut 11 into slot 5 as described in co-owned U.S. Pat. No. 8,650,752 issued on Feb. 18, 2014. Such engaging of aligning arm 205 with slot 5 allows the alignment of markings 510 with the aligning arm as described above.

Although only two extensions 212, 213 are illustrated in FIGS. 3-6, according to one aspect of the invention, two or more extensions 212, 213 may be mounted to plate 211. For example, three or more extension 212, 213 may be provided, for example, uniformly spaced about plate 211. In one aspect, plate 211 may be a circular plate having two or more extensions 212, 213.

Press mechanism 44 may include a wrench 230 (FIGS. 1-6) having teeth 235 (FIG. 7) engageable with teeth 511 (FIGS. 7-8) of nut 11 to allow a rotation of nut 11 via a rotation of wrench 230 by a user. Wrench 230 may include a base 236 and wrench extension arms 240 as depicted in FIGS. 3-6, for example.

For example wrench 230, including base 236 and wrench arms 240, may circumferentially surround collar 46 and may be movable away from arms 50 and handle 53 toward nut 11 and retractable in an opposite direction via a user pushing or pulling some or all of wrench 230 in a substantially axial direction relative to rod 40. For example, base 236 may be annular and arms 240 may have longitudinal dimensions extending parallel to an axis of base 236 and toward nut 11.

Wrench 230 may have a circular outer surface with wrench arms 240 located thereon and may be aligned coaxial to axes of rod 40, collar 46 and/or spindle 14. For example, wrench 230 may also be rotatable in a circumferential direction relative to axes of rod 40 and collar 46. Base 236 may include wrench lugs or grip portions 237 located circumferentially between wrench arms 240 and arms 240 and/or grip portions 237 may be utilized by a user to grip wrench 230 to rotate wrench 230. Grip portions 237 may also have longitudinal portions extending parallel to an axis of base 236 and toward nut 11 similar to arms 230, but grip portions may only extend an axial width of base 236.

Figure 7:
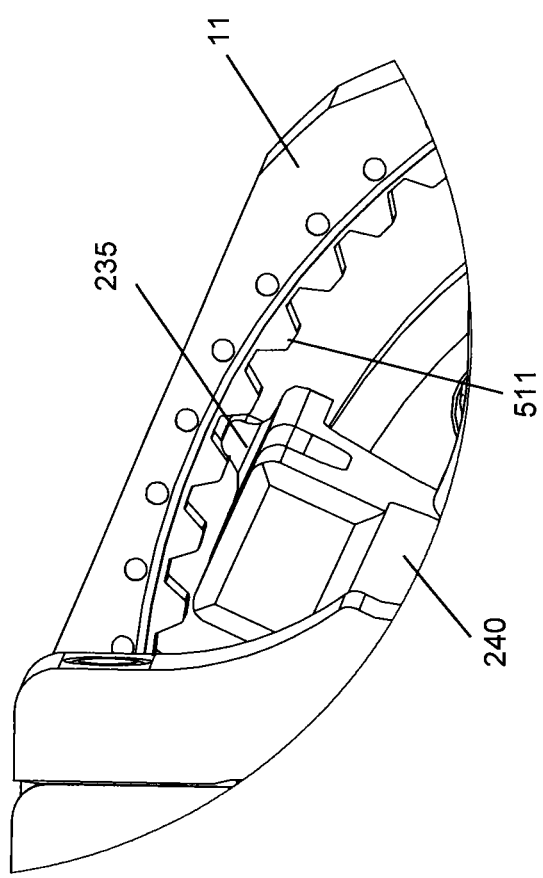
FIG. 7 is a close-up top perspective view of teeth of the assembly of FIG. 1 engaging teeth of a lock nut.

Wrench 230 may include multiple wrench extension arms 240 (e.g., 2 wrench extension arms 240) as depicted in the figures and each of such arms may include teeth 235 at a distal end 239 of each of arms 240 opposite base 236 such that teeth 235 may engage teeth 511 when wrench 230 is extended to contact nut 11 as depicted in a FIG. 7, for example. Teeth 238 may extend radially outwardly relative to a remainder of arms 240 to allow engagement of teeth 235 with teeth 511. Wrench extension arms 240 may be configured (e.g., shaped and dimensioned) such that the arms may extend toward nut 11 to engage teeth 511 as described without arms 240 extending radially outwardly past aligning arm 205 or extensions 212, 213. Nut 11 may be surrounded by hub assembly 12, as in a drive axle, such that it would not be possible to utilize a conventional wrench having inside flat portions to engage outside flat surfaces or sidewalls 523 of the nut. The engagement of teeth 235 of wrench arms 240 with teeth 511 of nut 11 thus allows a user to tighten and loosen nut 11 without accessing outer sidewalls of nut 11. Thus, the use of wrench 230 allows a user to selectively rotate nut 11 without accessing outside surfaces of nut 11 when nut 11 may be surrounded by a hub assembly or other barrier as in a steer axle.

In one example, FIG. 4 depicts a retracted proximal position of wrench 230 relative to press mechanism 20, and as depicted a distal end 242 of a first arm 243 of arms 240 is located proximal to a distalmost point 244 of collar 46.

Wrench 230 may be pushed toward nut 11 by a user to engage teeth 235 with teeth 511 and wrench 230 (e.g., base 236 connected to arms 240). For example, FIG. 5 depicts wrench 230 after being moved along collar 46 toward nut 11 (not shown in this figure for clarity) and away from handle 53 such that distal end 242 of first arm 243 extends distally past collar 46 and engages nut 11, i.e., teeth 235 of arm 243 engage teeth 511 of nut 11 (not shown in this figure for clarity).

FIG. 6. depicts wrench 230 after being rotated (e.g., arm 243 is rotated counter clockwise in a direction toward arm 212 as viewed in the figure) by a user such that arms 240 engaged with nut 11 cause the nut to rotate to a particular position as determined by the user, e.g., to arrive at a desired preload on bearing assembly 10.

A first opening 250 is located between aligning arm 205 and first loading arm 212 and a second opening 255 is located between aligning arm 205 and second loading arm 212. The openings allow a user to access wrench 230 (e.g., grip portion 237 or wrench arm 240) so that the user may rotate wrench 230 are described above.

Although wrench 230 is described to include a base extending circumferentially around rod 40, such base could be engaged to, coupled to, contact, or be connected to rod 40 otherwise to allow wrench 230 to remain with rod 40 while allowing wrench 230 to move forward and away from nut 11 to engage and disengage nut 11 and to rotate to cause a rotation of nut 11. Further, any number of wrench arms could be connected to a base of a wrench to engage teeth of such arms with nut 11. For example, wrench 230 could be a cylinder extending circumferentially around rod 40 and having one or more sets of teeth at a distal end to engage teeth 511 or nut 11.

In another example depicted in FIGS. 11-20, a preload apparatus 700 may be identical to preload apparatus 20 except that an aligning ring 800 may be utilized in place of aligning arm 205. The remaining portions of preload apparatus are the same as preload apparatus 20 and utilize the same reference numbers for identical parts.

Figure 18:
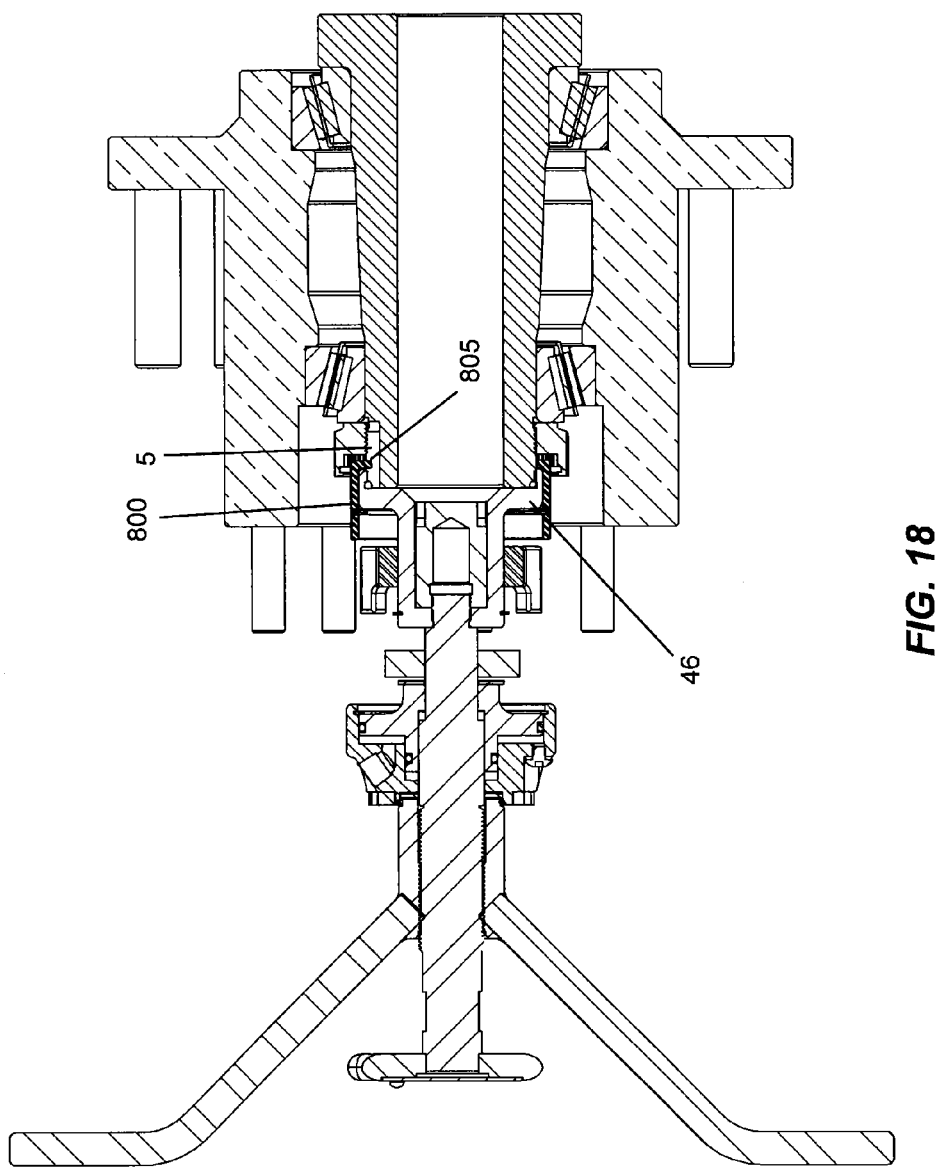
FIG. 18 is a side cross sectional view of the apparatus of FIG. 11.

Aligning ring 800 may include an aligning projection 805 that is configured (e.g., shaped and dimensioned) to be received in shaft slot 5. For example, projection 805 may have an end 806 that is circumferentially sized to be received in shaft slot 5 and which may contact inner surfaces of spindle 14 bounding shaft slot 5 to minimize any movement between ring 800 and spindle 14 when projection 805 is received in shaft slot 5. Projection 805 may be located axially forward (i.e., to right as depicted in FIG. 18) of collar 46 while a remainder of ring 800 may have an axial length that extends some or all of an axial length of ring 800. The location of projection 805 forward of collar 46 allows projection 805 to be received in shaft slot 5 prior to collar 46 being threaded onto end 13 of spindle 14 as a preload apparatus is attached to a bearing assembly. Projection 805 may be part of a forward ring portion 808 (FIG. 11) of ring 800 located on a forwardmost or distal end (i.e., to the right in FIG. 18) of collar 46 with ring 800 receiving a portion of collar 46 in an interior thereof and being rotatable thereto.

In another example, after nut 11 is initially threaded onto spindle 14, aligning projection 805 of ring 800 may be received in shaft slot 5 and ring 800 may be moved toward shoulder 524 of nut 11. Collar 46 may then be extended through an interior of ring 800 to connect to end 13 of spindle 14 while wrench 230 may be located radially outside of ring 800.

Ring 800 may include an indication or marking 815 on an outside surface of ring 800 at a location of projection 805 to allow such an indication or marking to be used as a reference point similar to the description above relative to aligning arm 205. Other markings or lines 816 may also be present on ring 800. Further, grip portions 237 of wrench 230 may include markings, such as an indicator line 810 (FIG. 13).

Figure 15:
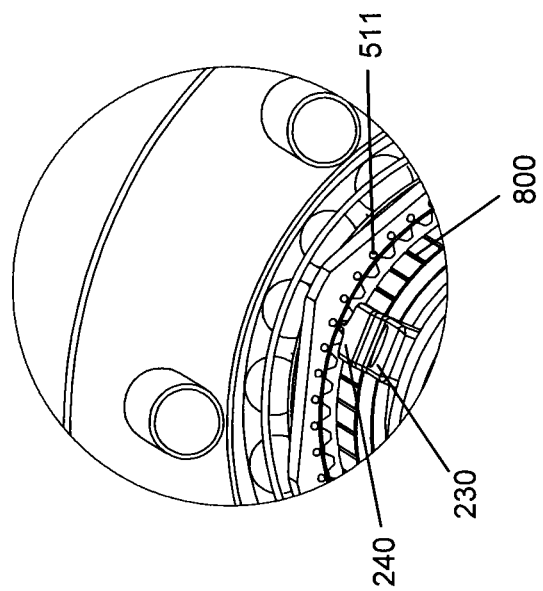
FIG. 15 is a close up perspective view of teeth of the wrench of FIG. 11 engaging teeth of a lock nut.
Figure 16:
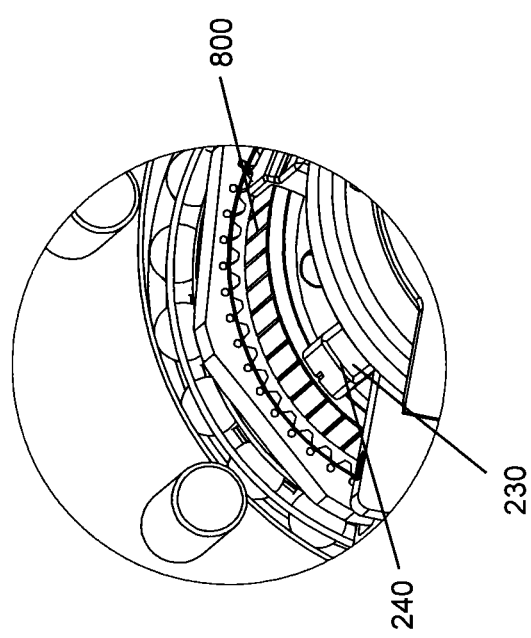
FIG. 16 is a close up perspective view of the wrench and aligning ring of FIG. 11 adjacent the nut of the assembly of FIG. 1.

A comparison of marking 815 and lines 816 with indicator line 810 may allow a user to selectively rotate (e.g., using wrench 230 engaging teeth 511 as depicted in FIGS. 15-16) the nut via a comparison of indicator line 810 (which would move with a rotation of the nut via the engagement of wrench 230 with teeth 511) with marking 815 and lines 816 of aligning ring 800 (which would not move relative to slot 5 in spindle 14), similar to the description above of a rotation of nut 11 relative to aligning arm 205 (e.g., when pressure is applied to bearing 16 by press mechanism 44 to allow rotation of nut 11), to an engaging position where the projection is at a desired position relative to one or more of markings 510 of nut 11. In such position, engaging teeth 511 may be properly engaged with keeper teeth 520 such that radially inner side 534 engages shaft slot 5 of spindle 14, i.e., after preload apparatus is removed and keeper 530 and keeper retaining member 540 engage nut 11. The comparison of an alignment of marking 815 and lines 816 with indicator line 810, i.e., instead of a comparison of markings 510 with marking 815 and lines 816, is desirable since markings 510 of nut 511 are not visible to a user when a drive axle, or other system surrounding a lock nut such that it is difficult to access the nut, is utilized as indicated above.

Figure 17:
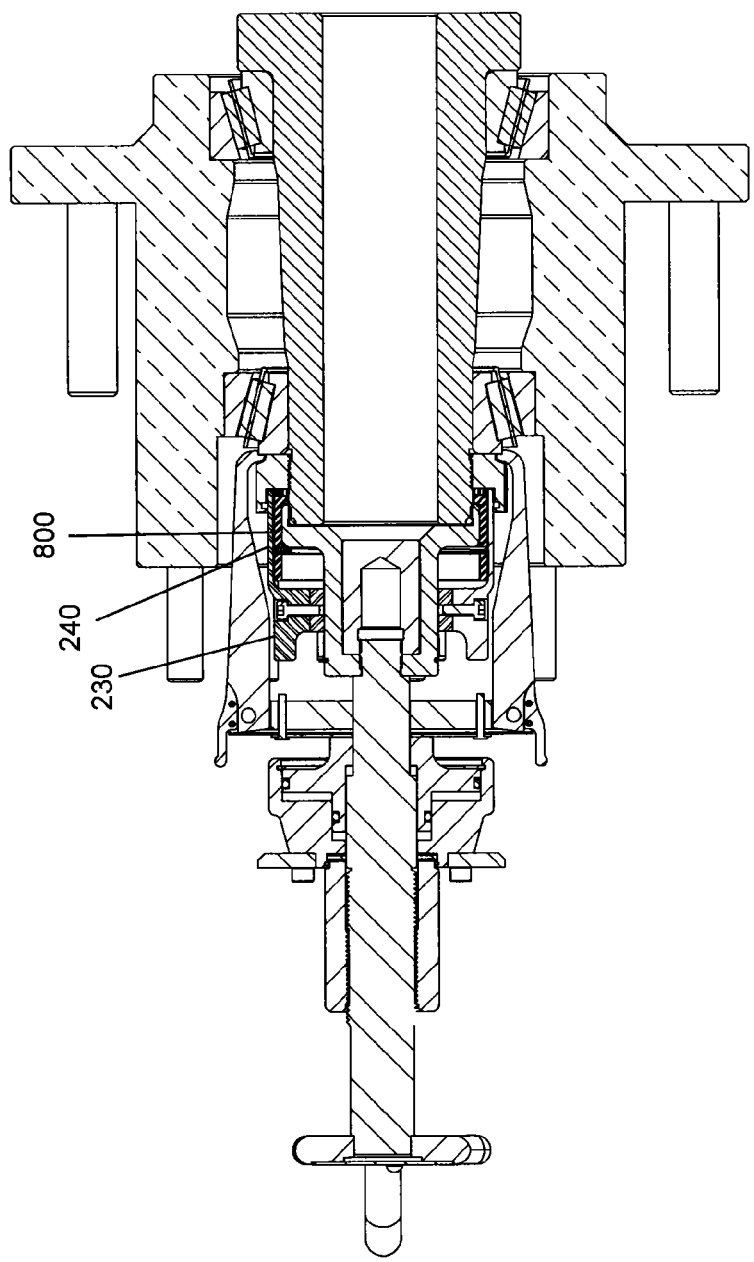
FIG. 17 is a top cross sectional view of the apparatus of FIG. 11.
Figure 19:
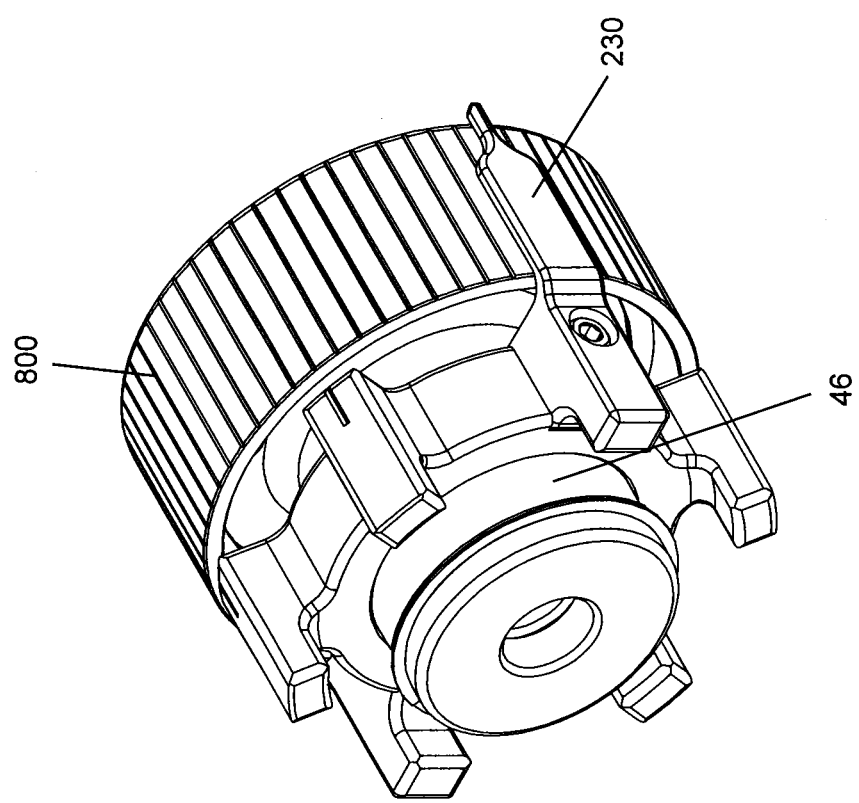
FIG. 19 is a perspective view of a portion of the apparatus of FIG. 11 including a collar, wrench and aligning ring.
Figure 20:
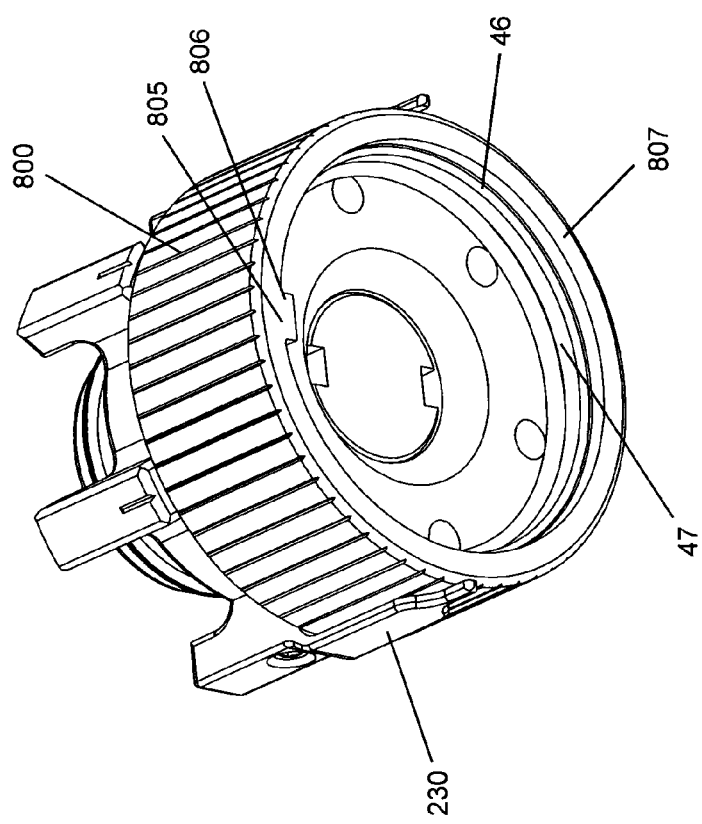
FIG. 20 is a perspective view of an opposite end of the collar, wrench and aligning ring of FIG. 19.

Further, ring 800 may be located radially inside wrench 230 such that wrench arms 240 extend from base 236 axially along an outside surface of ring 800 as depicted for example in FIG. 17 in a cross-sectional top view similar to FIG. 3. FIG. 18 depicts the subject matter of FIG. 17 but as a side view which omits wrench 230 and more clearly depicts ring 800 and projection 805 being received in shaft slot 5 as described above. FIG. 19 depicts wrench 230 around collar 46 and ring 800 with the rest of press mechanism 20 not shown for the sake of clarity. FIG. 20 depicts wrench 230 and collar 46 as depicted FIG. 19 but from an opposite perspective and showing a distal end 807 of ring 800 and threads 47 of collar 46. Wrench 230 is extended relative to ring 800 such that teeth 235 would engage teeth 511 (not shown in FIG. 20).

Figure 11:
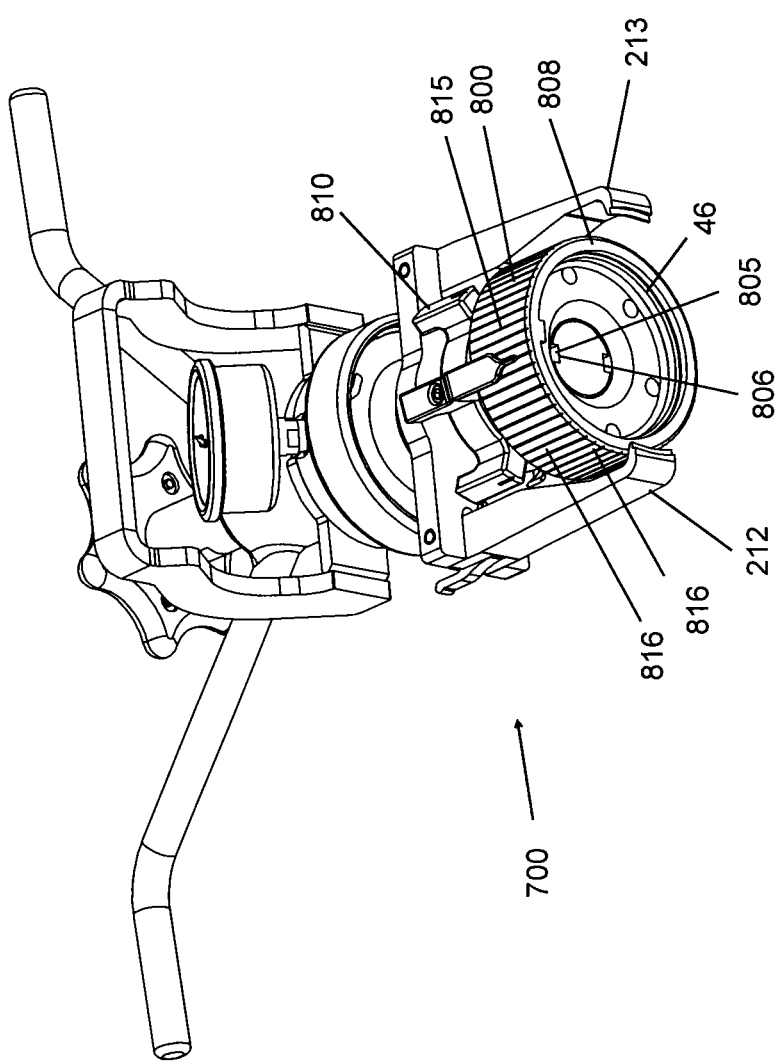
FIG. 11 is a front end perspective view of another embodiment of bearing preload apparatus with a wrench in first position.
Figure 12:
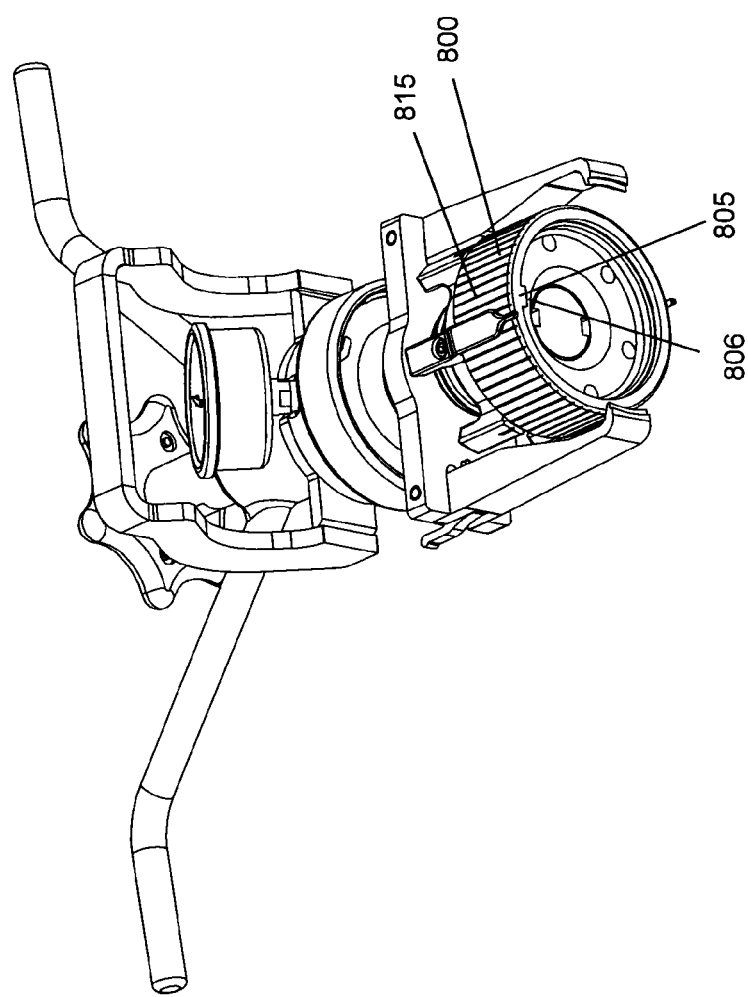
FIG. 12 is a front end perspective view of the apparatus of FIG. 11 with the wrench in a second position.
Figure 13:
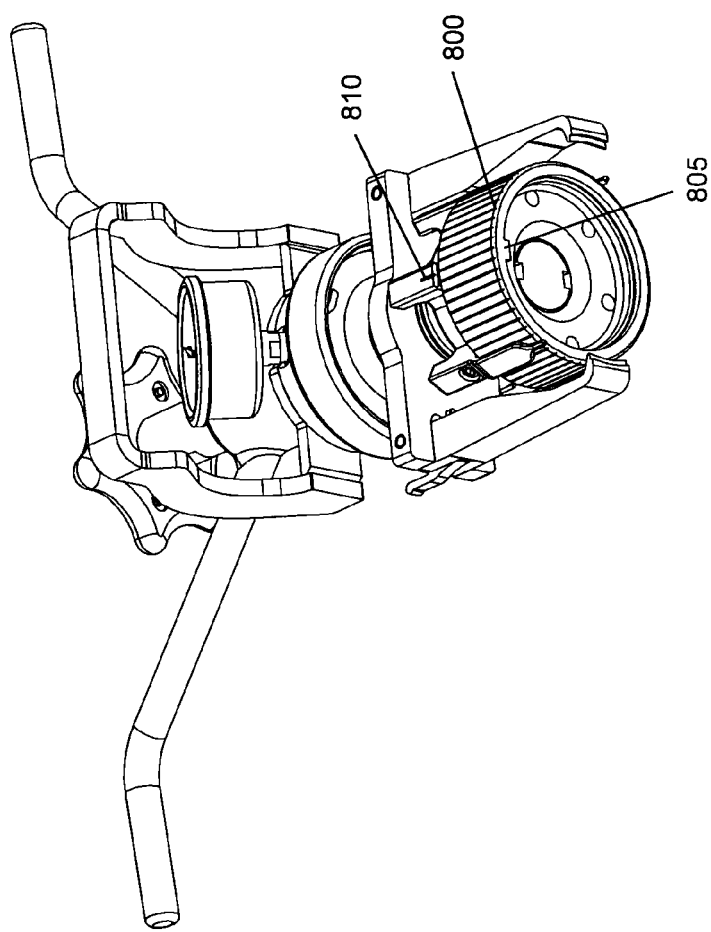
FIG. 13 is a front end perspective view of the apparatus of FIG. 11 with the wrench in a third position.
Figure 14:
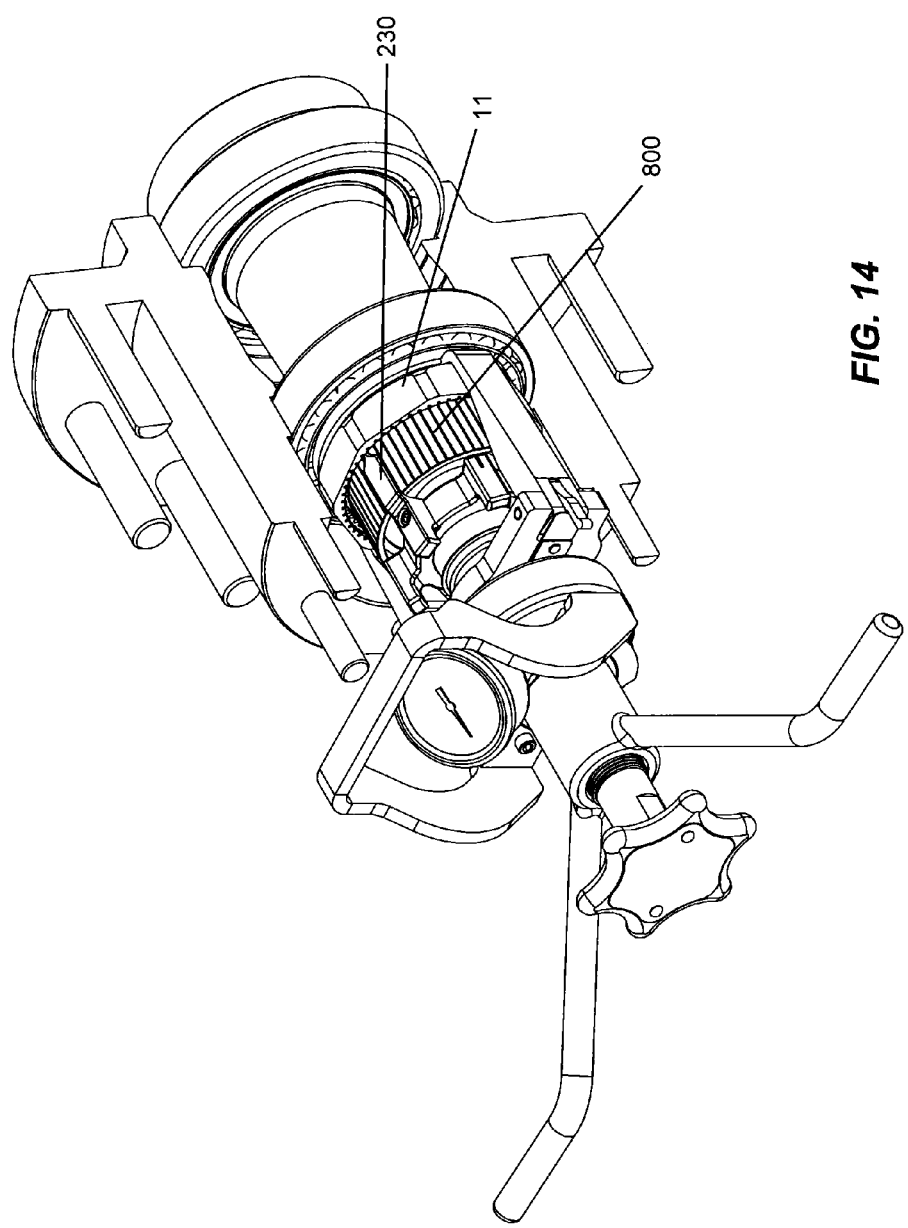
FIG. 14 is a perspective view, partially in a cross section, of a portion of the assembly shown in FIG. 1 with the apparatus of FIG. 11.

As depicted in FIGS. 11-13 (where nut 11 and the remainder of bearing assembly 10 is not shown for clarity), wrench 230 may move from a first position in FIG. 11 axially to a second position in FIG. 12 where teeth 235 at distal end 239 engage teeth 511 of nut 11. In FIG. 13, wrench 230 may be rotated relative to the two previous figures to rotate nut 11 as indicated above. FIG. 15 depicts a close up of teeth 235 engaging teeth 511 with ring 800 contacting shoulder 524 (FIG. 10) of 11. FIG. 14 depicts wrench 230 after being retracted from nut 11.

Similar to FIG. 2, FIG. 14 depicts hub assembly 10 engaging a bearing preload apparatus 20 with some of a section of the hardware removed to reveal inner structure and with ring 800 replacing aligning arm 205.

Figure 21:
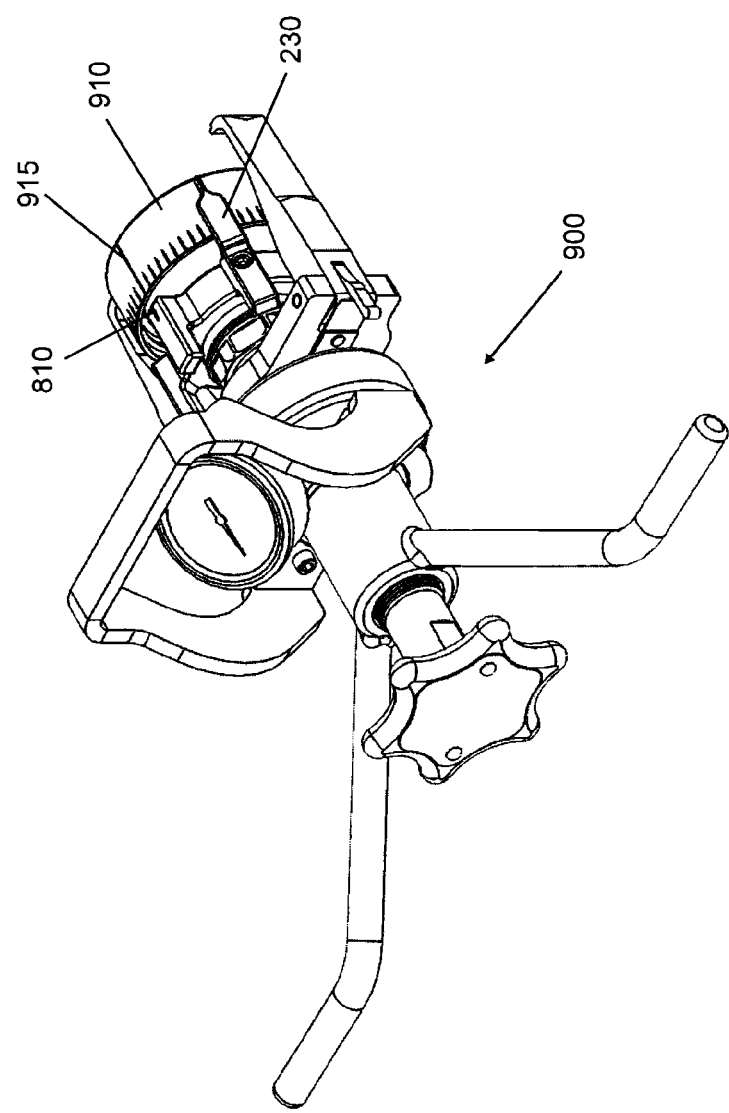
FIG. 21 is a perspective view of another embodiment of a preload apparatus in accordance with the present invention.
Figure 22:
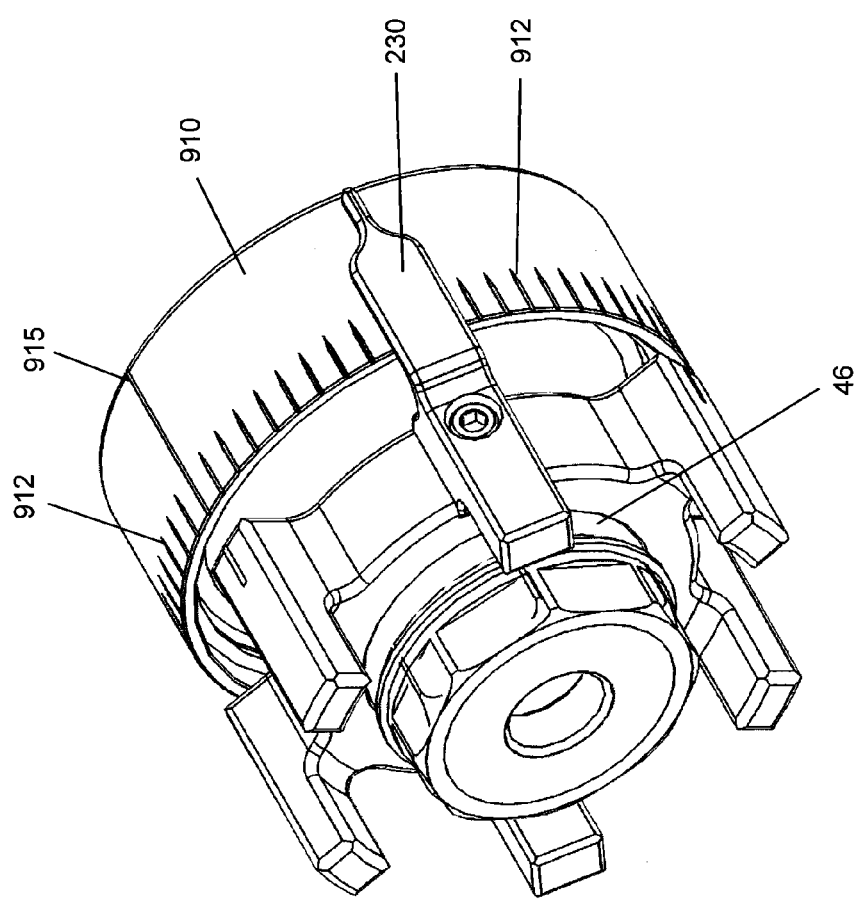
FIG. 22 is a perspective view of a portion of the apparatus of FIG. 21 including a collar, wrench and aligning ring.
Figure 23:
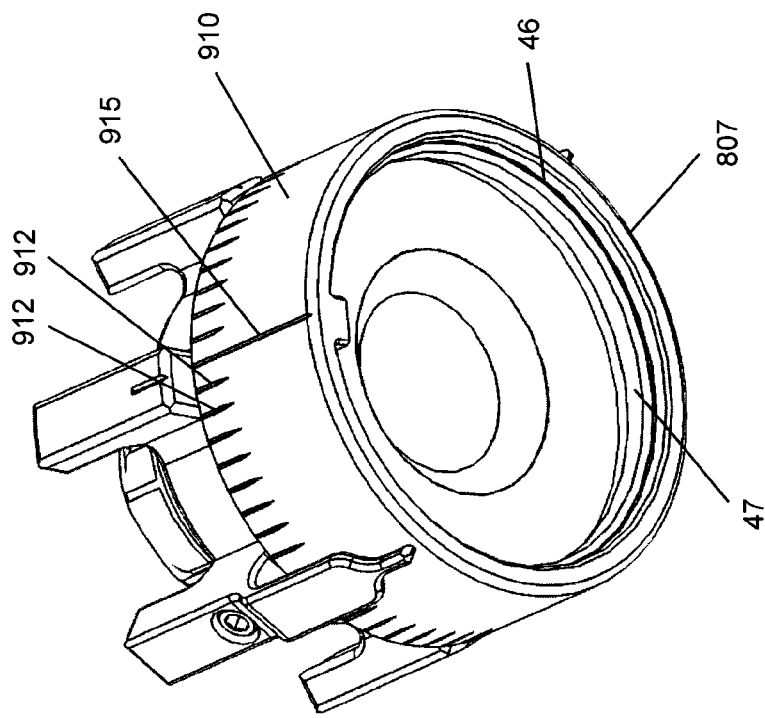
FIG. 23 is a perspective view of an opposite end of the collar, wrench, and aligning ring of FIG. 22.

In another example depicted in FIGS. 21-23, a preload apparatus 900 may be identical to preload apparatus 700 except that an aligning ring 910 may be utilized in place of aligning ring 800. Ring 910 may include a plurality of axially extending markings or lines 912 on an outer surface thereof with a longer line 915 being located at a circumferential location of aligning projection 805 to facilitate the use of such longer line 915 as a reference point during a rotation of nut 11 and alignment of indicator line 810 with line 915 and one or more of lines 912. The remaining portions of preload apparatus 900 are the same as preload apparatus 20 and utilize the same reference numbers for identical parts.

FIG. 22 depicts wrench 230 around collar 46 and ring 910 with the rest of press mechanism 20 not shown for the sake of clarity. FIG. 23 depicts wrench 230 and collar 46 as depicted in FIG. 21 but from an opposite perspective and showing a distal end 807 of ring 800 and threads 47 of collar 46. Wrench 230 is extended relative to ring 910 such that teeth 235 would engage teeth 511 (not shown in FIG. 22).

Figure 24:
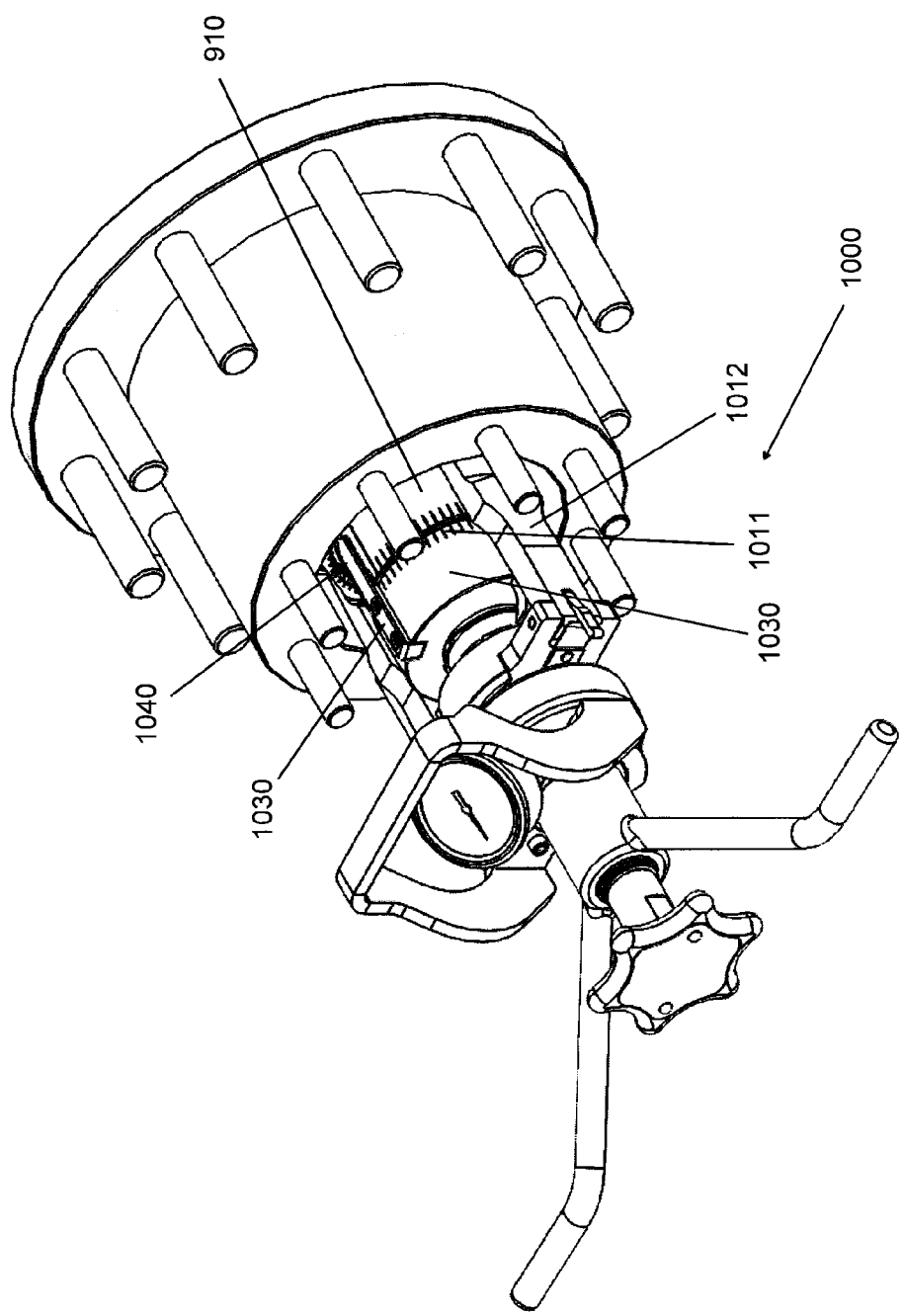
FIG. 24 is a perspective view of another embodiment of a preload apparatus showing a preload apparatus including arms, a collar, aligning ring and the nut of FIG. 1.
Figure 25:
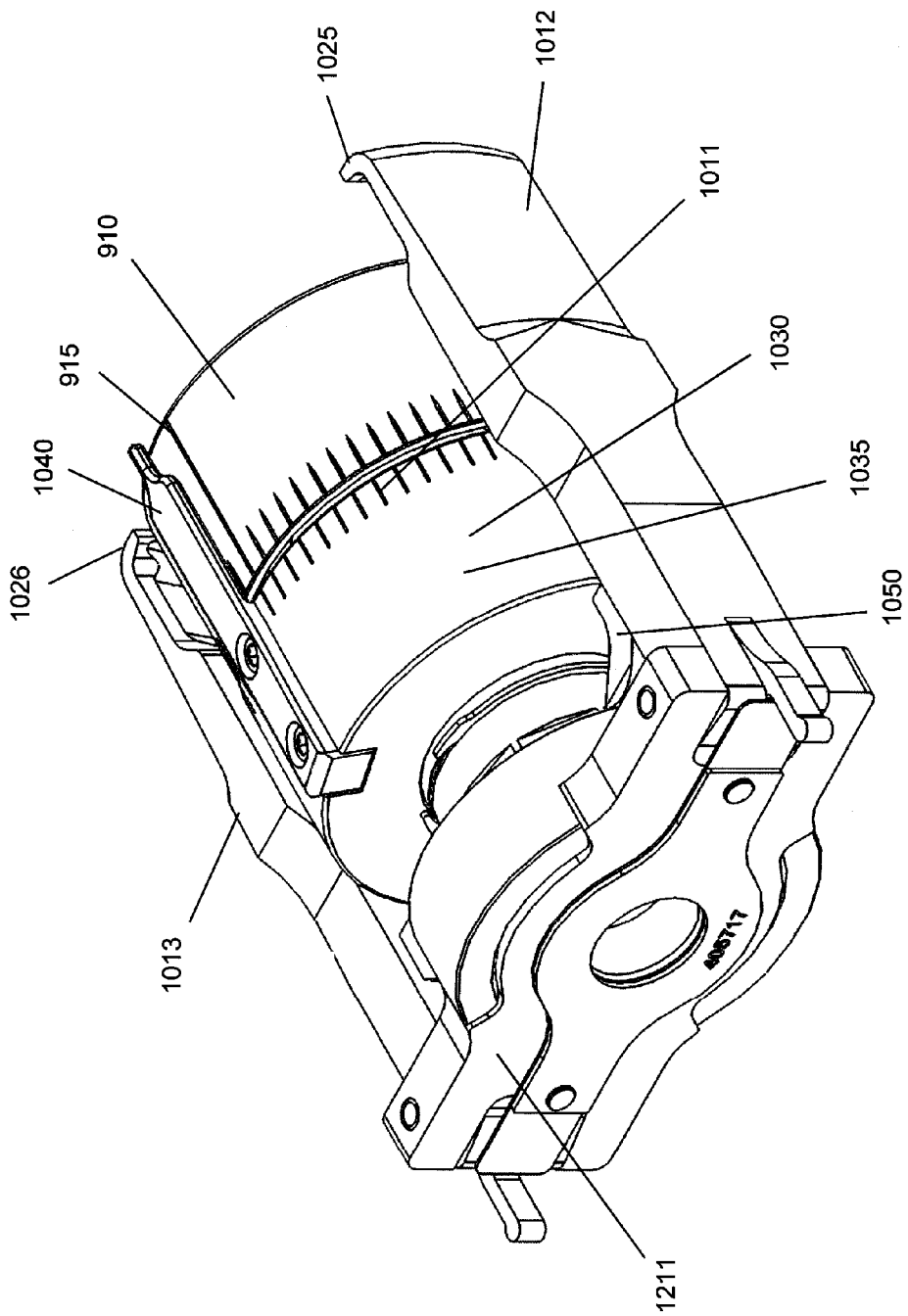
FIG. 25 is a perspective view of a portion of the assembly of FIG. 24 including a load adapter, wrench, and aligning ring.
Figure 26:
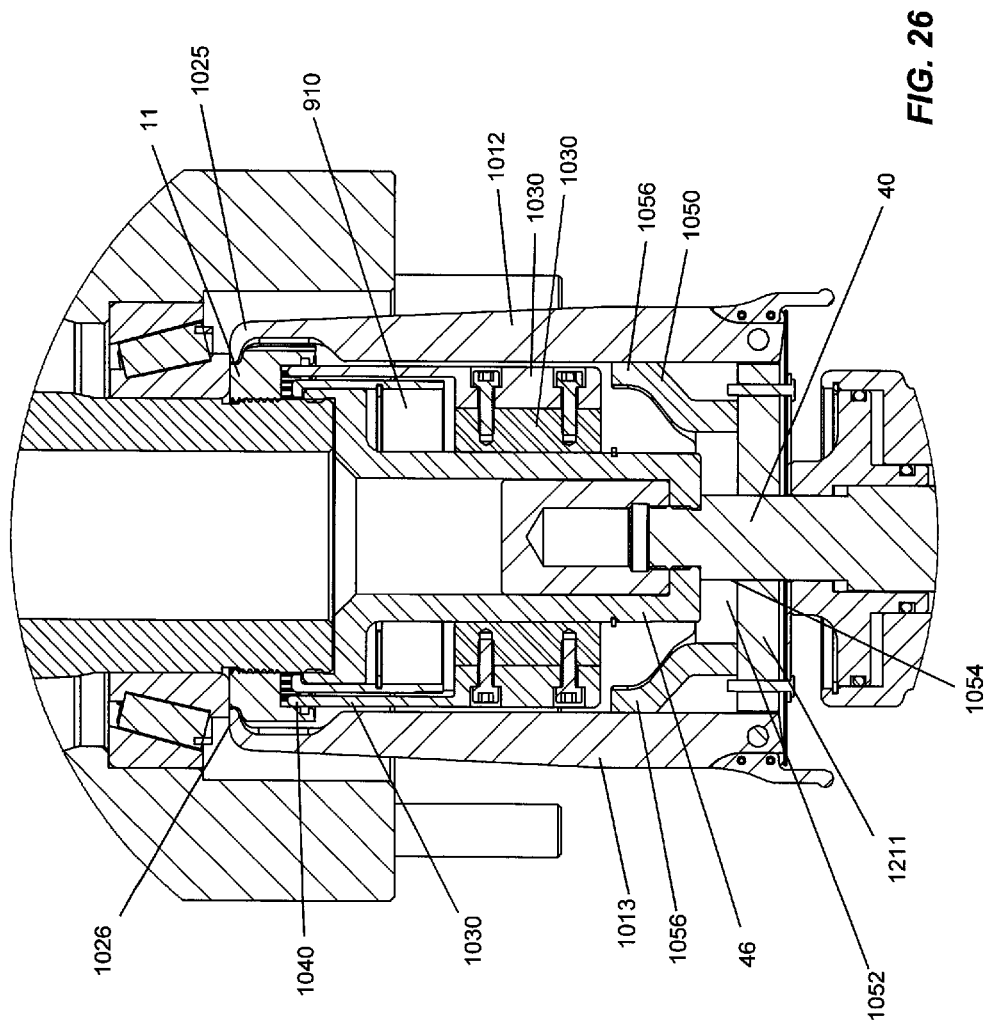
FIG. 26 is a top cross-sectional view of the assembly of FIG. 24.

In another example depicted in FIGS. 24-26, a preload apparatus 1000 may be identical to preload apparatus 900 except that a wrench 1030 may be utilized in place of wrench 230 and extensions 1012, 1013 may be used in place of extensions 212, 213. Wrench 1030 may include a cylindrical portion 1035 and wrench arms 1040 extending therefrom for engaging nut 11 as described above relative to wrench 230 and wrench arms 240. Wrench 1033 may circumferentially surround collar 46 and may be movable axially as described relative to wrench 230. Cylindrical portion 1035 may be aligned coaxial to an axis of rod 40, collar 46 and/or spindle 14 and may be rotatable about such axis or axes. Wrench 1030 may include a plurality of axially extending markings or lines 1011 on an outer surface thereof to allow an alignment of such lines with markings or lines 912 of ring 910 during a preloading process as described below.

Apparatus 1000 may also include a load arm stop ring 1050 configured to limit a radially inward movement of extensions 1012, 1013 toward each other as the extensions engage bearing 16 around nut 11. Extension 1012 and extension 1013 may have arcuate projections 1025, 1026 similar to projections 225, 226 described above but without the shoulders (i.e., shoulders 227, 228) for engaging bearing 16. Projections 1025, 1026 curve inwardly around nut 11, as depicted in FIG. 26, for example.

As indicated, projections 1025, 1026 do not include shoulders in contrast to shoulders 227, 228 of projections 225, 226. The shoulders (i.e., shoulders 227, 228) described above contact a bearing when the extensions engage the bearing with the engagement of the shoulders with the bearing causing the remainder of extensions 212, 213 to be at a desired position relative to the bearing and nut such that the extensions could be at a closest reasonable clearance to the nut and to maximize a contact surface with the bearing. The bearings with which the projections engage may vary according to manufacturer and even within bearings manufactured by a single manufacturer.

Stop ring 1050 may be utilized instead of the shoulders described to more consistently and precisely position projections 1025, 1026 relative to the bearing and nut with which it engages. More specifically, stop ring 1050 maintains extension 1012 and extension 1013, including projections 1025, 1026, at a desired radial distance relative to each other, and at a same radial distance from a centerline or axis of the bearing assembly or the preload apparatus, while avoiding a potential variation in radial distance between the extension caused by differences in bearing shape and dimension. Stop ring 1050 does not depend on a shape or dimension of the bearing (since it contacts inner surfaces of the extensions) which misaligns a distance of extensions 1012 and extension 1013 relative to each other due to the indicated potential variations. More specifically, stop ring 50 is configured to maintain the inner surfaces of the extensions at a same distance from the centerline or axis of the preload apparatus or bearing assembly, such that the locations of the extensions relative to each other do not depend on a shape or dimension of the bearing to which the extensions are engaged. Stop ring 1050 thus allows a more consistent engagement of extensions 1012 and extension 1013 with a bearing and thus a more consistent preload may be achieved.

As depicted in FIGS. 24-26, stop ring 1050 may abut plate 211 and may surround rod 40 and/or collar 46. Stop ring 1050 may include a central portion 1052 having a circular opening 1054 for receiving rod 40. Stop ring arms 1056 may extend from central portion 1052 to contact extension 1012 and extension 1013. Arms 1056 may include an axially extending portion 1058, an oblique portion 1060 and a contact portion 1062 extending axially and contacting extension 1012 or extension 1013. Arms 1056 may be configured to minimize or prevent contact of projections 1025, 1026 with nut 11 instead of shoulders 227, 228 engaging the bearing to perform this function as described above.

As indicated, outer surfaces of Arms 1056 may be shaped and dimensioned such that projections 1025, 1026 are at a closest reasonable clearance to the nut to maximize a contact surface of the projections with the bearing. Stop ring 1050 may be formed a material sufficiently rigid such that it does not deform in response to extension 1012 and extension 1013 abutting against the stop ring during engagement of the extensions with the bearing and a load being applied to the bearing via the extensions. By the projections avoiding contact with nut 11, a compressive load applied by press mechanism 44 is transmitted to bearing 16 and not borne by nut 11 as described. Nut 11 may also freely rotate without contact with the extensions. The remaining portions of preload apparatus may be the same as preload apparatus 20 and utilize the same reference numbers for identical parts.

Figure 31:
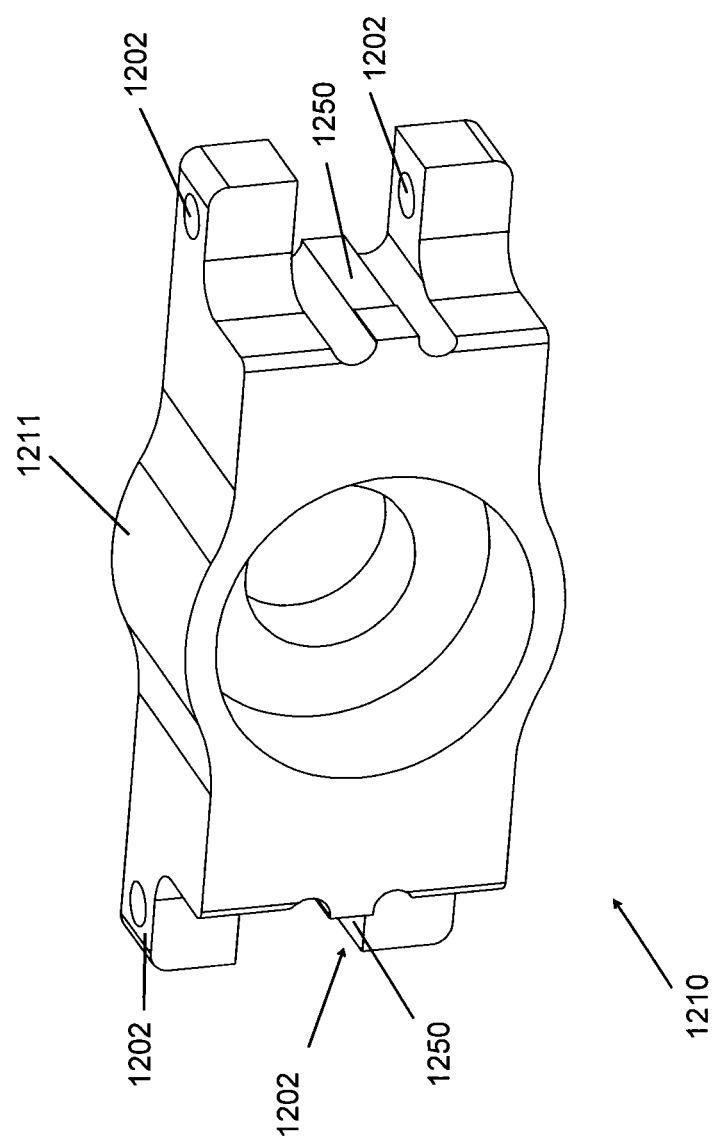
FIG. 31 is a perspective view of an embodiment of a stop ring and a loading adapter formed integrally.

FIGS. 25 and 26 depict wrench 1030 around collar 46, stop ring 1050 and ring 910 with the rest of press mechanism 20 not shown for the sake of clarity. In an example depicted in FIG. 31, a stop ring may be formed integrally or monolithically as one piece relative to a plate of a loading adapter 210, instead of attaching such a stop ring (e.g., stop ring 1050) to a plate (e.g., plate 211) of a loading adapter 210. A loading adapter 1210 may include a plate portion 1211 formed monolithically relative to a stop ring portion 1250 configured (e.g., shaped and dimensioned) to control a position of extensions (not shown in FIG. 31) relative to each other-similar to the extensions 212, 213 or extensions 1012, 1013 described herein. The extensions may be attachable to attaching points 1202 of plate portion 1211.

Figure 27:
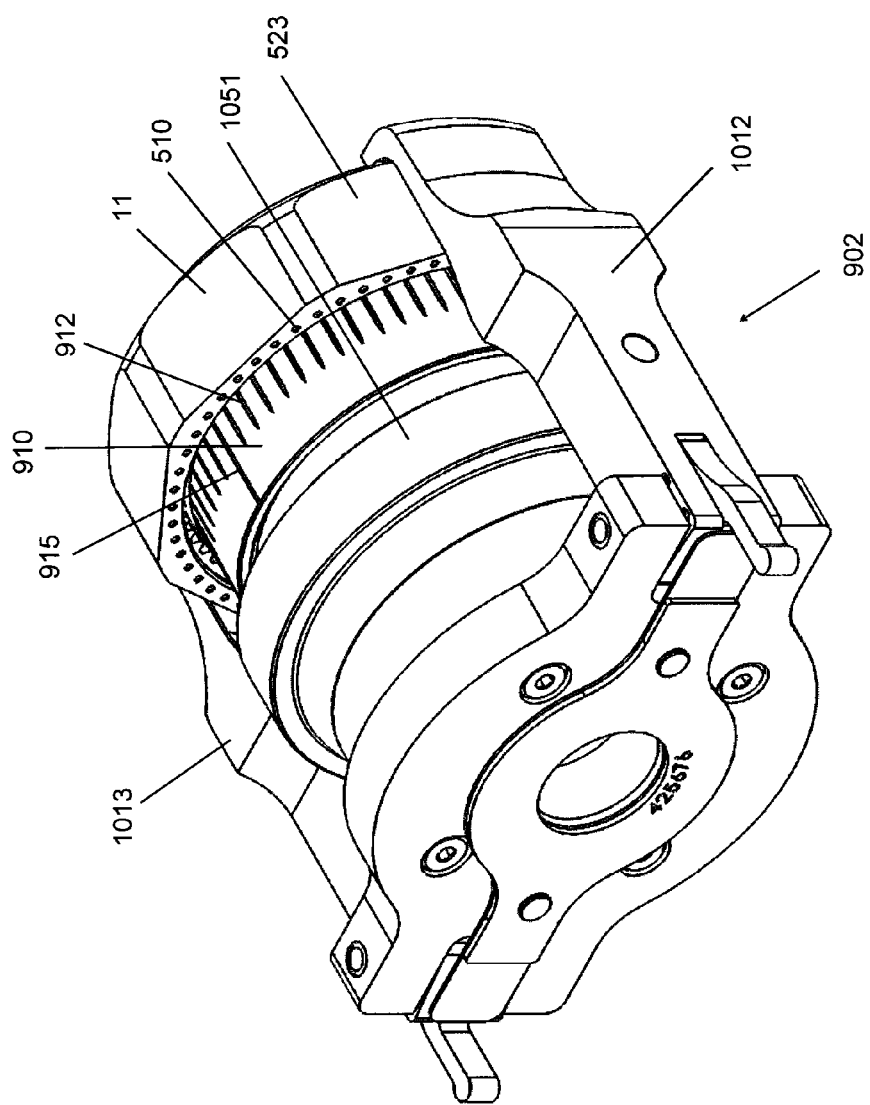
FIG. 27 is a perspective view of a portion of another embodiment of a preload apparatus including a load adapter, an aligning ring, and a stop ring.
Figure 28:
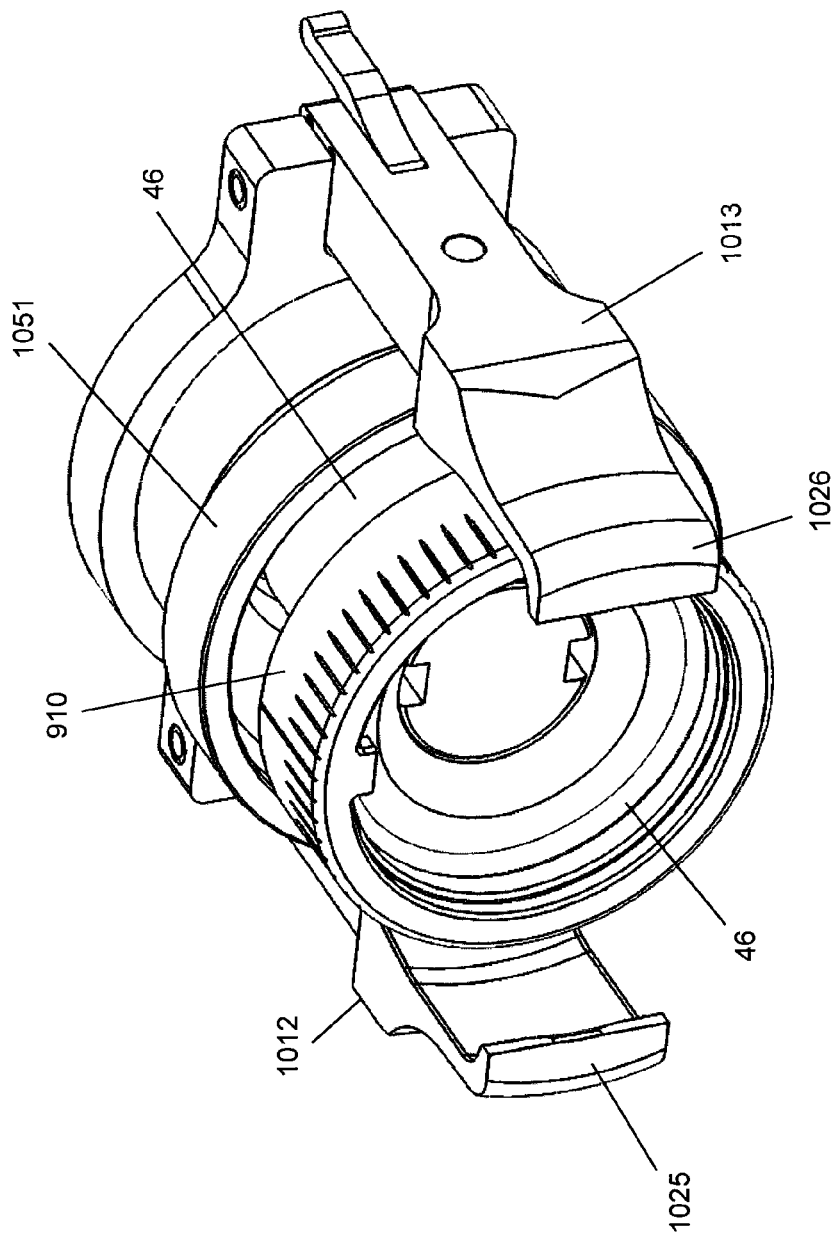
FIG. 28 is a is a perspective view of a portion of the assembly of FIG. 27 including a load adapter, wrench, and aligning ring.
Figure 29:
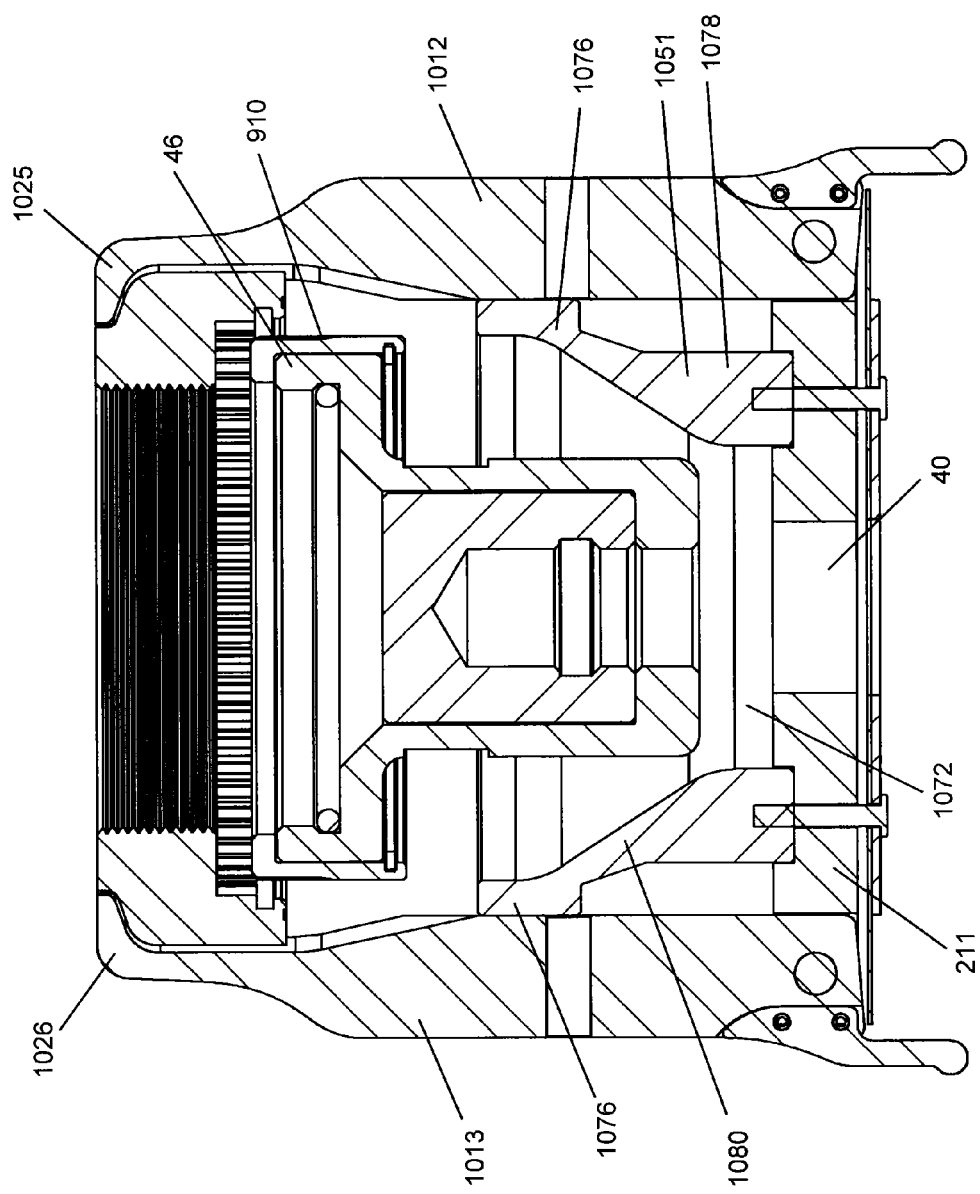
FIG. 29 is a top cross-sectional view of the assembly of FIG. 27.

In another example depicted in FIGS. 27-29, a preload apparatus 902 may be similar to preload apparatus 1000 except that wrench 1030 is missing and apparatus 902 may be engageable with a trailer hub/axle assembly (as opposed to a drive axle) which is configured to allow a user to access outer flat surfaces of nut 11 to cause a rotation of nut 11 without the necessity of using a wrench (e.g., wrench 1030) which accesses teeth 511 of nut 11 to tighten nut 11. As depicted in FIGS. 27-29, portions of apparatus 902 are not shown for ease of illustration with loading adapter 210 including arms 1012 and 1013 transmitting a load from press mechanism 44 (i.e., around nut 11) to bearing 16. Aligning ring 910 may be located on or near shoulder 524 of nut 11 and may include aligning projection 805 configured (e.g., shaped and dimensioned) to be received in shaft slot 5. Also, stop ring 1050 may be replaced by stop ring 1051 when compared to preload apparatus 1000. The remaining portions of preload apparatus 902 are the same as preload apparatus 1000 and utilize the same reference numbers for identical parts.

Stop ring 1051 is similar to stop ring 1050, and performs the same function, except that it may have a different shape including a stop ring arm 1076 being similar to arms 1056 except that arm 1076 forms a complete circular ring. Stop ring arm 1076 may extend from a central portion 1072 to contact extension 1012 and extension 1013. Arms 107 may include an axially extending portion 1078, an oblique portion 1080 and a contact portion 1072 extending axially and contacting extension 1012 or extension 1013.

Further relative to preload apparatus 902, a space may exist between outside flat surfaces or sidewalls 523 of nut 11 and an inner surface of bearing assembly (not shown) of trailer hub/axle assembly. As indicated above, longer line 915 may be utilized as a reference point during a rotation of nut 11 with a user comparing longer line 915 (or one or more of lines 912) with one or more of markings 510 of nut 11 instead of one of lines 1011 of wrench 1030 during a preload process as described below. As indicated, nut 11 may be accessible by a user such that the user may manually rotate nut 11 to a desired position taking into account a relationship of the markings or lines on nut 11 and aligning ring 910.

Figure 30:
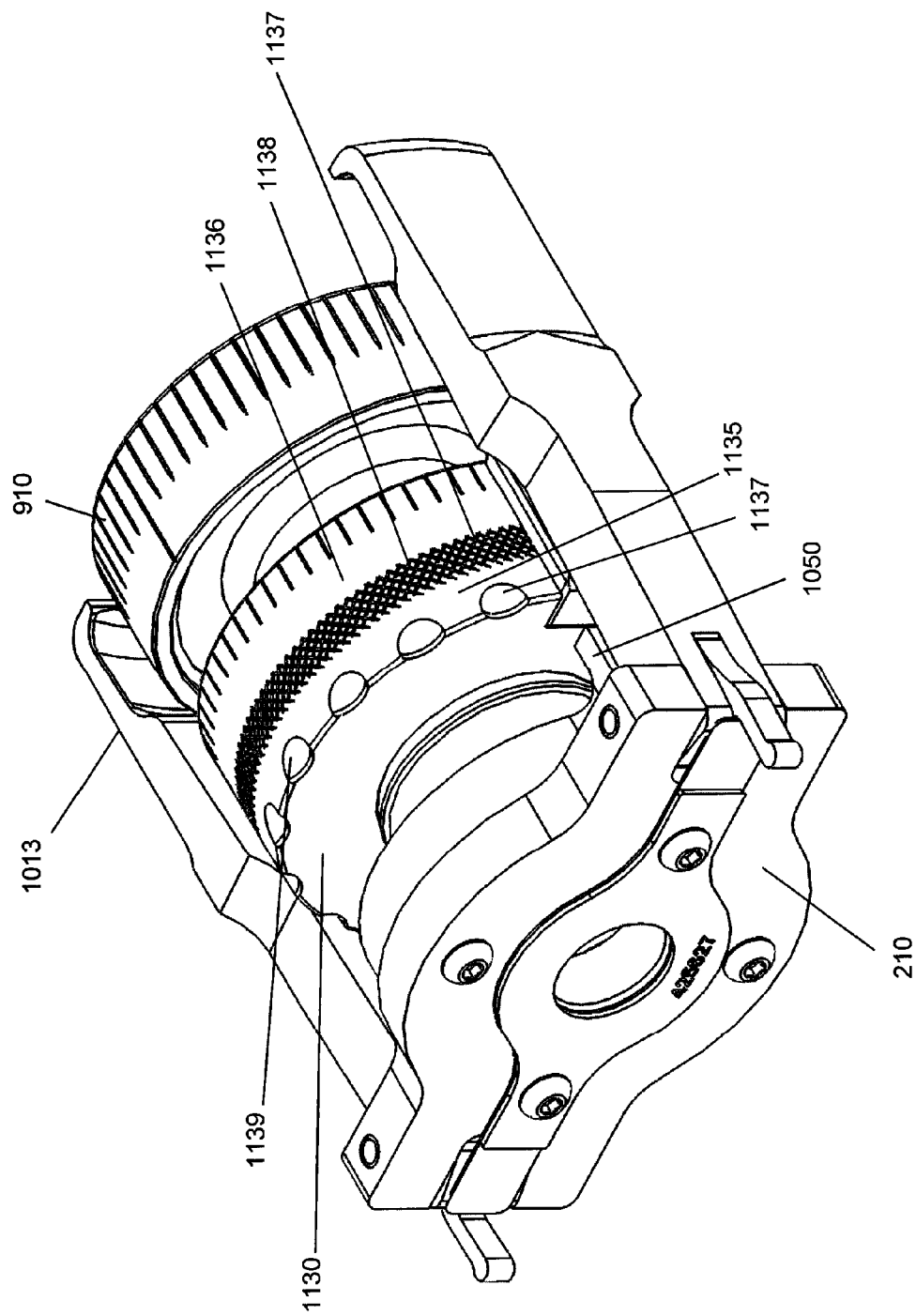
FIG. 30 is top cross-sectional view of another embodiment of a preload apparatus including a wrench, a load adapter, an aligning ring, and a stop ring.

In another example depicted in FIG. 30, a preload apparatus 1100 may be similar to preload apparatus 100 except that wrench 1030 is replaced by a wrench 1130. Portions of apparatus 1100 are not shown for ease of illustration with loading adapter 210 including arms 1012 and 1013 transmitting a load from press mechanism 44 (i.e., around nut 11) to bearing 16. Aligning ring 910 may be located on or near shoulder 524 of nut 11 and may include aligning projection 805 configured (e.g., shaped and dimensioned) to be received in shaft slot 5, which are depicted in FIGS. 24-26, but not FIG. 30. Wrench arms of wrench 1130 are also not depicted in FIG. 30 but are identical to wrench arms 1040 of wrench 1020 disclosed in FIGS. 24-27. The remaining portions of preload apparatus 1100 are the same as preload apparatus 1000 and utilize the same reference numbers for identical parts.

Wrench 1130 may include grip portions 1137 to allow a user to more easily grip and rotate wrench 1130 similar to the use of grip portions 237 of wrench 230 described above. Grip portions 1137 may be recesses or another variation in an outer surface 1136 of a cylindrical portion 1135 to allow a user to better grip wrench 1130 to cause a rotation thereof. For example, such a variation could be a roughened surface 1138, a recess 1139 or another surface having increased frictional properties for a user relative to a remainder of the outer surface of cylindrical portion 1135. Such variations, recesses or other increased frictional surfaces may be used together or separately for outer surface 1136. Further, such grip portions may be spaced evenly or otherwise circumferentially around cylindrical portion 1135.

Press mechanism 44 may be any apparatus that is configured to provide a compressive load (e.g., utilizing nut 48 as disclosed in patent '530) to outboard bearing 16 (e.g., an inner race thereof). Further, press mechanism 44 may include a load sensor or any means for monitoring the compressive load transferred to bearing 16. For example, an indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, a dial indicator may be mounted to detect and indicate the compression of one or more springs positioned in press mechanism 44 due to the advancement of nut 48, and the compression load calculated from the deflection indicated and the known spring constant of the springs used. This aspect of the invention may provide a reliable and repeatable means for monitoring the preload provided to inner race 15 of outboard bearing 16. The load sensor may be wired to an appropriate controller or processor and display to, for example, provide a digital readout of the compressive load to the mechanic operating a preload device (e.g., preload device 20, preload device 700, preload device 1000, preload device 902). The transmission of signals from the sensor may also be practiced wirelessly, for example, by means of an RF signal. This aspect of the invention may also provide a reliable and repeatable means for monitoring the preload provided to bearing 16.

As depicted in FIGS. 1-4, for example, press mechanism 44 includes a housing 52 and a movable piston 54 mounted for axial movement in housing 52. In this aspect of the invention, an internal cavity 56 is provided in housing 52 between the between housing 52 and piston 54, for example, an annular cavity as described in co-owned U.S. Pat. No. 8,650,752 issued on Feb. 18, 2014. Internal cavity 56 is at least partially filled, for example, substantially completely filled, with a fluid, for example, a gas, air, oil, water, and the like, that produces a hydrostatic pressure, P, when housing 52 is compressed by the advancement of nut 48 on rod 40. Piston 54 may be provided with one or more seals.

As shown in FIGS. 1-3, the compressive load applied by the advancement of nut 48 is transmitted to housing 52, to the fluid in cavity 56, to piston 54, to cylindrical housing 42, to hub 12, and ultimately to the outer race 21 of bearing 18. Thus, according to aspects of the invention, the hydrostatic pressure induced in the fluid in the cavity 56 by the advancement of nut 48 provides a direct indication of the preload on bearing 18.

In one aspect, the pressure P in cavity 56 may be monitored, for example, continuously, by means of a pressure sensor or pressure gage. As shown in FIGS. 1-3, pressure P in cavity 56 may be monitored by one or more pressure indicators 60 which is adapted to detect the pressure P in cavity 56 via a passage 58 in housing 52. Pressure indicator 60 may be an analog or digital pressure gage. Pressure indicator 60 may be a pressure sensor adapted to detect the pressure P in cavity 56 and forward an electrical signal corresponding to the pressure P to a processor or controller adapted to display the pressure, record the pressure, energize a circuit in response to the pressure, and/or provide a signal to the mechanic, for example, a tone or bell that a pressure corresponding to a desired preload on bearing 16 has been achieved.

In another aspect of the invention, press mechanism 44 may include at least one fluid, for example, a gas, such as air; or a liquid, such as, water, oil, or hydraulic fluid, the pressure of which can be detected and monitored, for example, by means of a pressure gage, pressure sensor, or a mechanical indicator. In one aspect not illustrated, the fluid pressure may comprise the source of compressive load on bearing 16. Such an apparatus would be similar to that depicted in FIG. 7 of co-owned U.S. Pat. No. 7,389,579 issued Jun. 24, 2008 (application Ser. No. 11/354,513, filed Feb. 15, 2006), except that loading adapter 210 is substituted for frame 42 depicted in FIG. 9 of the indicated patent application incorporated herein by reference. In such an embodiment, the fluid may be retained in a cavity for example, a deformable cavity, such as a bladder or hose, for example, an air spring; or a cavity having rigid walls and at least one moveable wall, for example, as in a cylinder and piston. In one aspect, the deformable cavity or air spring may be made of molded rubber, somewhat like an inner tube.

When air is used as the fluid, the air may be provided by conventional "shop air" at a pressure of about 100 psig. The pressure of the fluid in the deformable cavity may be monitored by means of sensor or pressure gage, for example, a pressure gauge mounted to a nozzle inserted the wall of the deformable or non-deformable cavity. In one aspect, a mechanical indicator may be activated, for example, a lever deflected when the desired fluid pressure in press mechanism 44 is reached advising the mechanic.

As discussed previously, press mechanism 44 and rod 40 thereof may be adapted to attach to exposed end 13 of spindle 14. Though this may be effected by many conventional means, including welding and mechanical fasteners, in the aspects of the invention shown in FIGS. 1-29, rod 40 is attached to end 13 of spindle 14 by collar 46. In the aspect shown, collar 46 is mounted to rod 40 by means of internal threads in collar 46 that thread onto external threads on rod 40. Collar 46 may also include a second set of internal threads 47 (FIG. 4) that engage external threads on spindle 14. According to one aspect, multiple collars 46 having varying diameters may be provided to accommodate varying diameters of spindle 14. Each of these collars 46 may be adapted to engage external threads on rod 40.

Rod 40, housing 42, collar 46, nut 48, arms 50, housing 52, piston 54, and housing 42 may be fabricated from any conventional structural metal, for example, iron, steel, stainless steel, aluminum, titanium, nickel, magnesium, brass, or bronze, among others.

In one aspect of the invention, preload apparatus 902 (FIGS. 27-29) may be used to apply and monitor a preload to outboard bearing 16. In a typical procedure, a wheel (not shown) may be dismounted from hub assembly 10, for example, which was mounted to studs on hub 12, as exemplified by stud 100 in FIGS. 1-3. Nut 11 may be loosened or hand tightened prior to mounting apparatus 1000, though any light load on nut 11 will typically be relieved with application of tension to spindle 14 by means of rod 40.

For example, a torque wrench and socket may be utilized to torque nut 11 and seat the bearings. The nut may then be tightened to a "hand tight" position followed by loosening of the nut by backing it off about ¼ turn. Alternatively, such tightening and loosening may be done using servo controlled wrench tools (not shown) which perform such tasks in response to a command by a user or which may be automatically performed in response to a set of instructions programmed and stored in the controller or a second controller or computer storage coupled to the controller.

Apparatus 902 may then be mounted to hub assembly 10 by attaching rod 40 to spindle 14 by means of collar 46. As a result, extensions 1012, 1013 are brought into contact with bearing 16 (e.g., an inner race thereof).

The loading of bearing 16 may be initiated by advancing, that, is tightening, nut 48, against housing 52 via bearing 62, for example, by means of arms 50. The buildup of pressure in cavity 56 as indicated by pressure indicator 60 may be monitored by the mechanic. The tightening of nut 48 continues until the target pressure (e.g., between 2000 and 4000, preferably about 3000, pounds force) is achieved. The hub assembly may be rotated at least one time (e.g., three times) to provide proper seating of the rollers in bearing 16, i.e., to permit the bearing rollers to settle in a minimum clearance, that is to settle with an essentially perfect alignment eliminating angular position variations sometimes referred to as skewed condition of the rollers. For example, nut 48 including arm 50 may be rotated three revolutions (e.g., by hand or by wrench 1030 engaging nut 11 and the user or mechanic rotating wrench 1030) and such nut handle may then be counter-rotated slightly to arrive at a desired pressure (e.g., between 800-1600 pounds, and preferably about 1000 pounds) as indicated on a pressure sensor (e.g., gauge 60). Once the target pressure is achieved in cavity 56, and the desired preload is applied to bearing 16, nut 11 may be tightened (e.g., by hand or via wrench 1030) against inner race 15. In on example, the nut may be tightened by hand until it is felt by the user to be in contact with a backface of the outer bearing to maintain the preload after apparatus 1000 is removed.

As indicated, aligning ring 910 may include axially extending lines 912 on an outer surface thereof with longer line 915 being located at the circumferential location of aligning projection 805. If the tightening causes lines 912 to align with one of markings 510 on nut 11 apparatus 902 may be loosened and removed and retaining member 540 may be engaged with retaining nut 11 and spindle 14 such that keeper teeth 520 engage teeth 511 of nut 11 and engaging member 534 of keeper 530 engage shaft slot 5 of spindle 14. If the tightening does not cause lines 912 to align with one of markings 510 on nut 11 the operator may carefully loosen nut 11 only until the one of lines 912 aligns with one of markings 510. For example, a space between each of markings 510 may be ⅟60 of a circumference of nut 11 so a 16 pitch nut thread having 0.0625" per revolution will only be moved up to 0.0625/60=0.00104 inches. For typical axles, a rotation from one of markings 510 to another of markings 510 will reduce a preload about 250 to 350 pounds, leaving the wheel end assembly inside of a recommended range. For example, such recommended range could be a force range recommended by SAE International in Specification J2535 originally published in 2001 and slightly revised in 2013 of about 500-1000 pounds. In another example, a common coarser axle thread pitch is 12 threads per inch or 0.0833"/rev. If a 60 space array is used with this thread the maximum preload range will be slightly more but still in the indicated 500 to 1000 pound recommended range. Lines 912 may be similarly spaced about the circumference of aligning ring 910.

In another example, access to a locking nut (e.g., nut 11) could be restricted by a housing and a preload apparatus (e.g., preload apparatus 1000) could include a wrench (e.g., wrench 1030) having lines 1011 on an outer surface thereof to allow an alignment of such lines with markings or lines 912 of ring 910 during a preloading process. In such a situation where the nut (e.g., nut 11) is inaccessible, the alignment of lines on ring 910 with markings on nut 11 described above would be replaced by an alignment of lines on ring 910 with lines (e.g., lines 1011) of the wrench (e.g., wrench 1030) as described further above relative to preload apparatus 1000.

Upon completion of the preloading, a preload apparatus (e.g., preload apparatus 20, preload apparatus 700, preload apparatus 1000, preload apparatus 902, preload apparatus 900) may be removed from wheel hub assembly 10, and keeper 530 and retaining member 540 may be engaged with retaining nut 11 and spindle 14 such that keeper teeth 520 engage teeth 511 of nut 11 and engaging member 534 of keeper 530 engage shaft slot 5 of spindle 14. As indicated above, nut 11 may be selectively rotated based on markings 510 and aligning arm 205, aligning ring 800 or ring 910, or a portion of aligning ring 800 or ring 910 and wrench 230 or wrench 1030, such that keeper teeth 520 and engaging teeth 511 engage one another and engaging member 534 engages shaft slot 5 in a manner to inhibit movement of spindle 14 relative to retaining nut 11 to maintain the preload. The wheel may then, for example, be remounted. Variations on this procedure while not deviating from the desired results may be apparent to those of skill in the art.

The preloading of the bearings as described above is advantageous relative to endplay adjustment but was rarely recommended prior to the present invention due to the difficulty of creating and verifying a correct preload site. A load sensor such as a pressure indicator or gauge (not shown) may be used along with the selective positioning of retaining nut 11 on spindle 14 (e.g., relative to aligning arm or a portion of aligning ring 800 or ring 910) provide for a repeatable correct and accurate preload setting.

In another example, press mechanism 44 may apply pressure by fluid pressure to provide the compressive load to bearing 16. In this aspect of the invention (not shown) described above relative to co-owned U.S. Pat. No. 7,389,579 instead of the compressive force provided by the advancing of a nut (e.g., nut 48), the compressive force provided by the nut may be supplemented by or replaced by fluid pressure provided to cavity 56 in housing 52 having piston 54. In this aspect, the fluid pressure may be provided by a conduit or hose (not shown). The hose may supply fluid, for example, hydraulic fluid, from a pressurized supply, for example, a pump. The fluid supplied to the hose may vary from 500 to 3000 psig. In one aspect, the fluid pressure provided through the hose may be the only supply of compressive force to the bearing.

Such a press mechanism applying pressure by fluid pressure may be used to automatically regulate the compressive load on bearing 16, for example, by regulating the pressure introduced to press mechanism 44 through the hose. In one aspect, the invention may include an automatic controller, for example, a PID controller, personal computer, or PLC controller adapted to regulate the pressure in the hose. For example, the predetermined preload and the parameters of the bearing being loaded may be entered into the controller and, after mounting a rod similar to rod 40, housing 42 and a press mechanism to bearing 16 (e.g., an inner race thereof), the controller may automatically ramp up the fluid pressure to provide the desired preload or to verify an existing preload. This aspect of the invention may be suitable for production line applications, among others.

In one aspect, the fluid provided by the hose may be provided by a pressure increasing device, for example, a pressure intensifier, that is, a device that converts one pressure to a higher pressure. For example, the pressure-increasing device may be provided with a pressure supply of, for example, 100 psig (for instance, shop air) and increased to, for example, 2000 psig hydraulic fluid, which is then supplied to the hose. Other sources of high-pressure fluid may be provided according to aspects of the invention.

Aspects of the invention may also be used to evaluate the preload or endplay on an existing bearing or bearing assembly. For example, an existing truck hub assembly may be evaluated for its existing preload and compared to the desired preload, and, if necessary, adjusted accordingly. First, the truck may be jacked up, if needed. (The hub may be allowed to cool, if necessary). A preload apparatus (e.g., preload apparatus 20, preload apparatus 700, preload apparatus 1000, preload apparatus 902) may then be mounted to bearing 16 and spindle 14 (with reference to FIGS. 1-3) and the press mechanism 44 actuated to introduce tension to spindle 14 and compression to bearing 16. (The wheel may be removed.) Press mechanism 44 may be regulated to, for example, vary the fluid pressure, to gradually increase the preload on bearing 16. While the load is increased, a mechanic can repeatedly check the load on or the "tightness" of nut 11. When nut 11 begins to loosen, the existing preload on bearing 16 has been met or exceeded. A comparison of the actual preload indicated by press mechanism 44, for example, the fluid pressure, with the desired preload can then be made. Any adjustments to the preload, either higher or lower, can be made according to the procedures described above and in U.S. Pat. No. 7,389,579.

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion of the keeper with a shaft, (e.g., a shaft slot thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An apparatus for providing a load on a bearing mounted to a shaft, the apparatus comprising:
   an attaching member releasably connectable to the shaft;
   a press mechanism coupled to said attaching member, said press mechanism configured to provide a compressive load to the bearing;
   said press mechanism comprising a wrench engageable with a lock nut on the shaft, and said wrench configured to engage and rotate the nut when said attaching member connects to the shaft;
   said wrench movable axially relative to an axial dimension of said press mechanism between a proximal non-engaged position proximal to a distal end of said attaching member and a distal engaged position distal to said distal end of said attaching member such that said wrench engages the nut in said distal engaged position and said wrench avoids engaging the nut in said proximal non-engaged position; and
   said wrench comprising wrench arms extending from a wrench base toward the nut to engage teeth of the nut when said wrench engages the nut to rotate the nut, said wrench arms located radially outside said attaching member and extending distally past said attaching member when said wrench engages the nut.

2. The apparatus of claim 1 wherein said attaching member comprises a collar and said wrench extends circumferentially around said collar, and said wrench moves along said collar in an axial direction relative to said collar from said proximal non-engaged position to said distal engaged position.

3. The apparatus of claim 1 wherein said press mechanism comprises a rod and a press, said wrench extending circumferentially around an axis extending through said rod, and said wrench moves along said axis in an axial direction relative to said collar from said proximal non-engaged position to said distal engaged position when said wrench moves axially relative to said axial dimension of said press mechanism.

4. The apparatus of claim 1 wherein said base comprises a grip portion thereon to allow a user to grip said wrench to rotate said wrench to rotate the nut.

5. The apparatus of claim 4 wherein said grip portion comprises a projection relative to an outer surface of said wrench.

6. The apparatus of claim 4 wherein said grip portion comprises a variation in an outer surface of said wrench.

7. The apparatus of claim 6 wherein said variation comprises a roughened surface relative to a remainder of said outer surface of said wrench.

8. The apparatus of claim 1 wherein said plurality of wrench arms comprise teeth at distal ends of said arms, said teeth configured to engage nut teeth of the nut to allow said wrench to cause a rotation of said nut when said wrench is rotated by a user.

9. The apparatus of claim 8 wherein said teeth comprise radially external teeth configured to engage internal nut teeth of the nut to allow the engaging of the wrench and the nut.

10. The apparatus of claim 1 wherein said press mechanism comprises a plurality of extensions extending towards a wheel hub assembly, said plurality of extensions being configured to contact a wheel hub or/or a bearing of said wheel hub assembly when said attaching member is attached to the shaft, said plurality of extensions located radially outward of said wrench relative to said axial dimension of said press mechanism.

11. The apparatus of claim 1 further comprising an aligning ring having an aligning projection configured to engage a shaft slot of the shaft to align said press mechanism relative to the shaft when said attaching member connects to the shaft.

12. The apparatus of claim 11 wherein said aligning ring comprises a plurality of ring indicating markings to allow an alignment of a ring indicating marking of said plurality of ring indicating markings with said wrench.

13. The apparatus of claim 12 wherein said wrench comprises a wrench indicating marking to allow an alignment of said wrench indicating marking with said ring indicating marking.

14. The apparatus of claim 1, wherein said press mechanism further comprises a frame axially separated from, and coupled to, the attaching member, to allow said frame to move axially relative to said attaching member along a longitudinal axis of the shaft.

15. The apparatus of claim 14, further comprising a plurality of extensions extending towards a wheel hub assembly from said frame, said plurality of extensions being configured to contact a wheel hub or/or a bearing of said wheel hub assembly when said attaching member is attached to the shaft, said plurality of extensions located radially outward of said wrench relative to said axial dimension of said press mechanism.

16. The apparatus of claim 14, wherein said wrench is located distally relative to said frame.

17. The apparatus of claim 1, wherein said attaching member comprises an inside threaded surface releasably, threadably, and directly connectable to a circumferential outside surface of an exposed end of the shaft of the wheel hub assembly.

\* \* \* \* \*